(12) United States Patent
Condo et al.

(10) Patent No.: US 6,744,561 B2
(45) Date of Patent: *Jun. 1, 2004

(54) MULTILAYER OPTICAL BODIES

(75) Inventors: Peter D. Condo, Lake Elmo, MN (US); Timothy J. Hebrink, Oakdale, MN (US); John A. Wheatley, Lake Elmo, MN (US); Andrew J. Ouderkirk, Woodbury, MN (US); Andrew T. Ruff, Mendota Heights, MN (US); Yaoqi J. Liu, Maplewood, MN (US); Milton H. Andrus, Jr., Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/215,791

(22) Filed: Aug. 9, 2002

(65) Prior Publication Data

US 2003/0053215 A1 Mar. 20, 2003

Related U.S. Application Data

(63) Continuation of application No. 09/444,756, filed on Nov. 22, 1999, now Pat. No. 6,498,683.

(51) Int. Cl.$^7$ .............................. G02B 5/28; G02B 1/10
(52) U.S. Cl. ........................ 359/589; 359/580; 359/587
(58) Field of Search ................................ 359/265, 359, 359/580, 582, 584, 586–589, 592, 593, 498; 345/49, 105; 428/212

(56) References Cited

U.S. PATENT DOCUMENTS

| 3,124,639 A | 3/1964 | Kahn |
| 3,610,729 A | 10/1971 | Rogers |
| 3,711,176 A | 1/1973 | Alfrey, Jr. et al. |
| 3,860,036 A | 1/1975 | Newman, Jr. |
| 4,310,584 A | 1/1982 | Cooper et al. |

(List continued on next page.)

FOREIGN PATENT DOCUMENTS

| EP | 0488544 | 11/1991 |
| WO | WO 95/27919 | 4/1995 |
| WO | WO 95/17303 | 6/1995 |
| WO | WO 95/17691 | 6/1995 |
| WO | WO 95/17692 | 6/1995 |

(List continued on next page.)

OTHER PUBLICATIONS

Schrenk et al., Nanolayer polymeric optical films, Tappi Journal, pp. 169–174, Jun., 1992.

*Primary Examiner*—Georgia Epps
*Assistant Examiner*—Jack Dinh
(74) *Attorney, Agent, or Firm*—Bruce E. Black

(57) ABSTRACT

Optical bodies, comprising: a plurality of first optical layers comprising a first polymer composition that comprises (i) a polyester portion having terephthalate comonomer units and ethylene glycol comonomer units, and (ii) a second portion corresponding to a polymer having a glass transition temperature of at least about 130° C.; and a plurality of second optical layers disposed in a repeating sequence with the plurality of first optical layers. Also disclosed are optical bodies comprising: (a) a plurality of first optical layers, each first optical layer being oriented; and (b) a plurality of second optical layers, disposed in a repeating sequence with the plurality of first optical layers, comprising a blend of polymethylmethacrylate and polyvinylidene fluoride. Methods of making the above-described optical bodies, and articles employing such optical bodies are also provided.

19 Claims, 22 Drawing Sheets

U.S. PATENT DOCUMENTS

| | | | |
|---|---|---|---|
| 4,446,305 | A | 5/1984 | Rogers et al. |
| RE31,780 | E | 12/1984 | Cooper et al. |
| 4,520,189 | A | 5/1985 | Rogers et al. |
| 4,521,588 | A | 6/1985 | Rogers et al. |
| 4,525,413 | A | 6/1985 | Rogers et al. |
| 4,720,426 | A | 1/1988 | Englert et al. |
| 5,103,337 | A | 4/1992 | Schrenk et al. |
| 5,188,760 | A | 2/1993 | Hikmet et al. |
| 5,211,878 | A | 5/1993 | Reiffenrath et al. |
| 5,235,443 | A | 8/1993 | Barnik et al. |
| 5,269,995 | A | 12/1993 | Ramanathan et al. |
| 5,278,694 | A | 1/1994 | Wheatley et al. |
| 5,294,657 | A | 3/1994 | Melendy et al. |
| RE34,605 | E | 5/1994 | Schrenk et al. |
| 5,316,703 | A | 5/1994 | Schrenk |
| 5,319,478 | A | 6/1994 | Fijfschilling et al. |
| 5,339,198 | A | 8/1994 | Wheatly |
| 5,360,659 | A | 11/1994 | Arends et al. |
| 5,389,324 | A | 2/1995 | Lewis et al. |
| 5,448,404 | A | 9/1995 | Schrenk et al. |
| 5,486,935 | A | 1/1996 | Kalmanash |
| 5,486,949 | A | 1/1996 | Schrenk et al. |
| 5,552,927 | A | 9/1996 | Wheatly et al. |
| 5,612,820 | A | 3/1997 | Schrenk et al. |
| 5,614,286 | A | 3/1997 | Bacon, Jr. et al. |
| 5,629,055 | A | 5/1997 | Revol et al. |
| 5,686,979 | A | 11/1997 | Weber et al. |
| 5,699,188 | A | 12/1997 | Gilbert et al. |
| 5,721,603 | A | 2/1998 | De Vaan et al. |
| 5,744,534 | A | 4/1998 | Ishiharada et al. |
| 5,751,388 | A | 5/1998 | Larson |
| 5,767,935 | A | 6/1998 | Ueda et al. |
| 5,770,306 | A | 6/1998 | Suzuki et al. |
| 5,783,120 | A | 7/1998 | Ouderkirk et al. |
| 5,793,456 | A | 8/1998 | Broer et al. |
| 5,808,794 | A | 9/1998 | Weber et al. |
| 5,825,542 | A | 10/1998 | Cobb, Jr. et al. |
| 5,825,543 | A | 10/1998 | Ouderkirk et al. |
| 5,828,488 | A | 10/1998 | Ouderkirk et al. |
| 5,837,359 | A | 11/1998 | Fergason |
| 5,872,653 | A | 2/1999 | Schrenk et al. |
| 5,882,774 | A * | 3/1999 | Jonza et al. ................ 428/212 |
| 5,888,603 | A | 3/1999 | Fergason |
| 5,940,149 | A | 8/1999 | Vanderwerf |
| 5,962,114 | A | 10/1999 | Jonza et al. |
| 5,965,247 | A | 10/1999 | Jonza et al. |
| 5,976,424 | A | 11/1999 | Weber et al. |
| 5,991,077 | A | 11/1999 | Carlson et al. |
| 5,999,230 | A | 12/1999 | Larson |
| 6,005,713 | A | 12/1999 | Carlson et al. |
| 6,024,455 | A | 2/2000 | O'Neill et al. |
| 6,031,665 | A | 2/2000 | Carlson et al. |
| 6,049,419 | A | 4/2000 | Wheatley et al. |
| 6,080,467 | A | 6/2000 | Weber et al. |
| 6,082,876 | A | 7/2000 | Hanson et al. |
| 6,088,159 | A | 7/2000 | Weber et al. |
| 6,088,163 | A | 7/2000 | Gilbert |
| 6,096,247 | A | 8/2000 | Ulsh et al. |
| 6,096,375 | A | 8/2000 | Ouderkirk et al. |
| 6,117,530 | A | 9/2000 | Jonza et al. |
| 6,157,486 | A | 12/2000 | Benson, Jr. et al. |
| 6,160,663 | A | 12/2000 | Merrill et al. |
| 6,185,039 | B1 | 2/2001 | Allen et al. |
| 6,208,466 | B1 | 3/2001 | Liu et al. |
| 6,256,146 | B1 | 7/2001 | Merrill et al. |
| 6,268,961 | B1 | 7/2001 | Nevitt et al. |
| 6,322,236 | B1 | 11/2001 | Campbell et al. |
| 6,329,046 | B1 | 12/2001 | Merrill et al. |
| 6,352,761 | B1 | 3/2002 | Hebrink et al. |
| 6,381,068 | B1 | 4/2002 | Harada et al. |
| 6,407,862 | B2 | 6/2002 | Moshrefzadeh |
| 6,449,093 | B2 | 9/2002 | Hebrink et al. |
| 6,459,514 | B2 | 10/2002 | Gilbert et al. |
| 6,486,997 | B1 | 11/2002 | Bruzzone et al. |
| 6,498,683 | B2 * | 12/2002 | Condo et al. ................ 359/589 |

FOREIGN PATENT DOCUMENTS

| | | |
|---|---|---|
| WO | WO 95/17699 | 6/1995 |
| WO | WO 97/01440 | 1/1997 |
| WO | WO 97/01774 | 1/1997 |
| WO | WO 97/01778 | 1/1997 |
| WO | WO 99/06203 | 2/1999 |
| WO | WO 99/36248 | 7/1999 |
| WO | WO 99/36257 | 7/1999 |
| WO | WO 99/36258 | 7/1999 |
| WO | WO 99/36262 | 7/1999 |
| WO | WO 99/36808 | 7/1999 |
| WO | WO 99/36809 | 7/1999 |
| WO | WO 99/36812 | 7/1999 |
| WO | WO 99/36813 | 7/1999 |
| WO | WO 99/36814 | 7/1999 |
| WO | WO 00/07044 | 2/2000 |
| WO | WO 00/07046 | 2/2000 |
| WO | WO 00/65385 | 11/2000 |
| WO | WO 02/31540 | 4/2002 |

* cited by examiner

| resin | ($/lb) | n |
|---|---|---|
| —— PEN | 4.75 | 1.75 |
| —— PC | 2.89 | 1.59 |
| —— PET | 0.59 | 1.65 | a  PEN:PMMA (18323-7)
b  PEN:PMMA/PVDF (18325-6)

solid line=TD
dashed line=MD

——— PEN:PMMA (18323-7, 2.55 mil, 36in, MD)
——— PEN:PMMA/PVDF(60/40) (18325-6, 2.56 mil, 36 in, MD)

——— PEN:PMMA (18323-7, 2.51 mil, 11 in, MD)
——— PEN:PMMA/PVDF(60/40) (18325-6, 2.56 mil, 36 in, MD)

solid line=TD
dashed line=MD a   PEN:PMMA (18323-7)
b   PEN:PMMA/PVDF (18325-6)

a  PEN:PMMA (18323-7)
b  PEN:PMMA/PVDF (18325-6)

solid line=TD
dashed line=MD

MULTILAYER OPTICAL BODIES

This patent application is a continuation of U.S. patent application Ser. No. 09/444,756, filed Nov. 22, 1999, now U.S. Pat. No. 6,498,683 incorporated herein by reference.

FIELD OF THE INVENTION

This invention relates to multilayer light-reflecting optical bodies. In addition, the invention relates to multilayer optical bodies that reflect light over a range of wavelengths (e.g., mirrors, color mirrored films, IR reflective films, and UV reflective films).

BACKGROUND OF THE INVENTION

Polymeric films are used in a wide variety of applications. One particular use of polymeric films is in mirrors which reflect light over a particular wavelength range. Such reflective films can be disposed, for example, behind a backlight in liquid crystal displays to reflect light toward the display to enhance brightness of the display. Color shifting films can be used in signage, packaging materials, etc. IR mirror films can be used, for example, to reduce solar heat load entering a building or vehicle through its windows. Ultraviolet (UV) films can be used to protect other films or objects from UV light to prevent deleterious effects (e.g., photodegradation of a polymeric film).

Coextrusion casting processes have been used to make multilayer optical mirrors. Generally, however, cast films have a number of practical drawbacks. For example, cast films generally have low refractive index differences between the high and low index materials and do not generally have matching refractive indices in the z-direction, limiting the optical performance for a given number of layers. Because of the limited optical power of such cast films, dyes and pigments also typically are used to enhance the color of color mirror films. Moreover, some cast films, particularly films made of noncrystalline materials, can also have limited thermal stability, dimensional stability, environmental stability and/or solvent resistance.

Coextrusion-orientation processes have been used to provide films with better optical performance due to the large refractive index difference between high and low index materials and the capability of matching refractive indices in the z-, or out-of-plane direction when at least one of the materials is birefringent. One example of a previously formed film has high index layers formed of polyethylene naphthalate (PEN) and low index layers of polymethyl methacrylate (PMMA). Orientation of PEN increases the refractive indices of the PEN layers and, therefore, increases the optical power of the PEN/PMMA films. PEN, however, is a relatively expensive material which is difficult to protect from ultraviolet radiation, and polyethylene terephthalate (PET), a lower index alternative to PEN, cannot easily be suitably oriented with PMMA due to the difference in glass transition temperatures of these materials (about 84° C. for PET and about 106° C. for PMMA).

SUMMARY OF THE INVENTION

In aspect, the present invention provides an optical body, comprising: (a) a plurality of first optical layers, each first optical layer being oriented and comprising a polyester having terephthalate comonomer units and ethylene glycol comonomer units and having a glass transition temperature less than or equal to about 90° C.; and (b) a plurality of second optical layers disposed in a repeating sequence with the plurality of first optical layers, each second optical layer comprising a polymer composition; the optical body being configured and arranged to reflect at least a portion of light over at least one wavelength region.

In another aspect, the invention provide an optical body, comprising: a plurality of first optical layers, each first optical layer being oriented and comprising a first polymer composition, the first polymer composition comprising:
  (i) a polyester portion having terephthalate comonomer units and ethylene glycol comonomer units, and
  (ii) a second portion corresponding to a polymer having a glass transition temperature of at least about 130° C.; and a plurality of second optical layers disposed in a repeating sequence with the plurality of first optical layers, each second optical layer comprising a second polymer composition.

In yet another aspect, the invention provides an optical body, comprising:
  (i) a plurality of first optical layers, each first optical layer being oriented and comprising a polyester having terephthalate comonomer units and ethylene glycol comonomer units; and
  (ii) a plurality of second optical layers disposed in a repeating sequence with the plurality of first optical layers, each second optical layer comprising a polymer composition, the polymer composition having a glass transition temperature of less than or equal to about 90° C. and comprising a polymer selected from the group consisting of polyacrylates and aliphatic polyolefins.

In still another aspect, the invention provides an optical body, comprising: (a) a plurality of first optical layers, each first optical layer being oriented; and (b) a plurality of second optical layers disposed in a repeating sequence with the plurality of first optical layers, each second optical layer comprising a blend of polymethylmethacrylate and polyvinylidene fluoride; the optical body being configured and arranged to reflect at least a portion of light over at least one wavelength region.

Methods of making the above-described optical bodies, and articles employing such optical bodies are also provided.

The above summary of the present invention is not intended to describe each disclosed embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
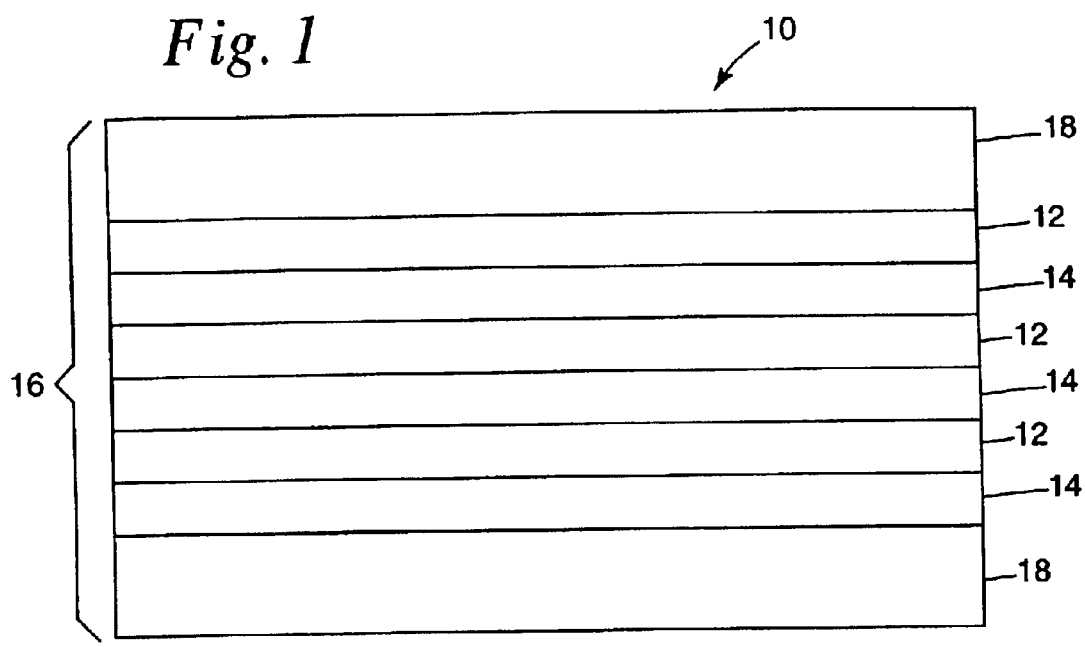
FIG. 1 is a schematic cross-sectional diagram of a first embodiment of a multilayer optical body according to the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENTS

The present invention is generally directed to light-reflecting multilayer optical bodies (such as multilayer optical films) and their manufacture, as well as the use of the multilayer optical bodies as polarizers and mirrors and in devices. These multilayer optical bodies include multilayer optical films, methods of making and using these multilayer optical films, and articles incorporating the multilayer optical films. The multilayer optical bodies reflect light over a wavelength range (e.g., all or a portion of the visible, IR, or UV spectrum). The multilayer optical bodies are typically coextruded and oriented multilayer structures that differ from previous optical bodies, at least in part, due to the selection of materials which can provide processing, economic, optical, mechanical, and other advantages. While the present invention is not so limited, an appreciation of various aspects of the invention will be gained through a discussion of the examples provided below.

The term "birefringent" means that the indices of refraction in orthogonal x, y, and z directions are not all the same. For the polymer layers described herein, the axes are selected so that x and y axes are in the plane of the layer and the z axis is normal to the plane of the layer and typically corresponds to the thickness or height of the layer. For an oriented polymer, the x-axis is generally chosen to be the in-plane direction with the largest index of refraction, which typically corresponds to one of the directions in which the optical body is oriented (e.g., stretched).

The term "in-plane birefringence" is the absolute value of the difference between the in-plane indices ($n_x$ and $n_y$) of refraction.

The term "polymer" will be understood, unless otherwise indicated, to include polymers and copolymers (i.e., polymers formed from two or more monomers including terpolymers, etc.), as well as polymers or copolymers which can be formed in a miscible blend by, for example, coextrusion or reaction, including transesterification. Block, random, graft, and alternating copolymers are included, unless indicated otherwise.

All birefringence and index of refraction values are reported for 632.8 nm light unless otherwise indicated.

Multilayer Optical Films

Figure 2:
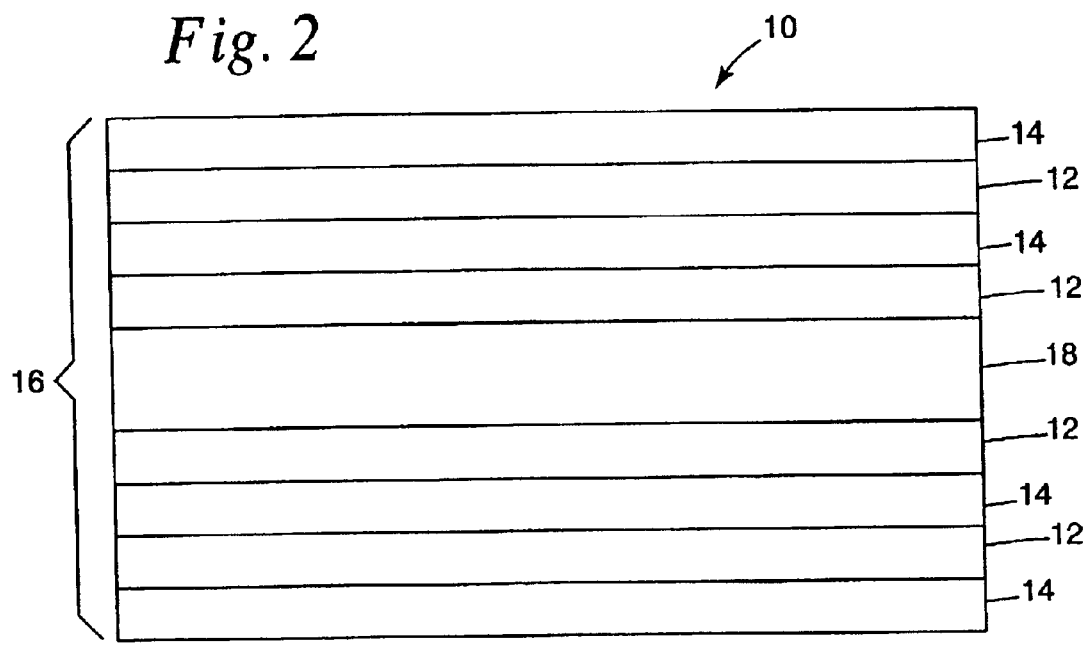
FIG. 2 is a schematic cross-sectional diagram of a second embodiment of a multilayer optical body according to the invention.

FIGS. 1 and 2 illustrate multilayer optical bodies 10 (e.g., multilayer optical films) that can be used as, for example, a mirror, a polarizer, an IR film, a UV film, or a color-shifting film. The optical bodies 10 include one or more first optical layers 12, one or more second optical layers 14, and one or more non-optical layers 18. The non-optical layers 18 can be disposed on a surface of the multilayer optical body as a skin layer (FIG. 1) or disposed between optical layers (FIG. 2). The first and second optical layers and, optionally, the non-optical layers, if any, are coextruded and oriented by, for example, stretching. Orientation typically significantly enhances the optical power (e.g., reflectivity) of the multilayer optical bodies due to birefringence of the first or second optical layers or both.

Such multilayer optical bodies include multilayer optical films that are suited to applications such as, for example, (i) reflective polarizers used in laptop and palmtop computer displays, cellular phone, pager, and watch displays, (ii) mirror films used in enhanced lighting, medical, and horticultural applications, (iii) color shifting films for decorative and security applications, (iv) IR reflective films used as heat management films in fields such as the automotive, horticultural, optoelectronic filtration, and architectural fields, and (v) UV reflective films used, for example, to protect other films and objects from UV radiation.

The optical layers 12, 14 are typically interleaved to form a stack 16 of layers, optionally, with one or more of the non-optical layers 18 included within or as a skin layer of the stack. Typically the optical layers 12, 14 are arranged as alternating pairs, as shown in FIG. 1, to form a series of interfaces between layers with different optical properties. The optical layers 12, 14 are typically no more than 1 μm thick and can have a thickness of 400 nm or less. The optical layers can have the same thicknesses. Alternatively, the multilayer optical body can include layers with different thicknesses to increase the reflective wavelength range.

Although FIG. 1 shows only six optical layers 12, 14, multilayer optical bodies 10 can have a large number of optical layers. Examples of suitable multilayer optical bodies include those having about 2 to 5000 optical layers. Generally, multilayer optical bodies have about 25 to 2000 optical layers and typically about 50 to 1500 optical layers or about 75 to 1000 optical layers. It will be appreciated that, although only a single stack 16 is illustrated in FIG. 1, the multilayer optical body 10 can be made from multiple stacks that are subsequently combined to form the optical body 10.

Additional sets of optical layers, similar to the first and second optical layers 12, 14, can also be used in the multilayer optical body 10. The design principles disclosed herein for the sets of first and second optical layers can be applied to any additional sets of optical layers. In addition, different repeating patterns of optical layers can be used (e.g., "ABCBA . . . ", where A, B, and C are optical layers with different compositions). Some such patterns as set forth in U.S. Pat. No. 5,360,569, which is incorporated herein by reference.

The transmission and reflection characteristics of the multilayer optical bodies are based on coherent interference of light caused by the refractive index difference between the first and second optical layers and the thicknesses of the first and second optical layers. When the in-plane indices of refraction differ between the first and second optical layers, the interface between adjacent first and second optical layers forms a reflecting surface. The reflective power of the interface depends on the square of the difference between the in-plane indices of refraction of the first and second optical layers (e.g., $(n_{1o}-n_{2o})^2$, where $n_{1o}$ is an in-plane refractive index of the first optical layers and $n_{2o}$ is an in-plane refractive index of the second optical layers).

In mirror applications, the multilayer optical body typically includes first and second optical layers where both in-plane refractive indices differ, substantially (e.g., differ by at least 0.04 and, often, by at least 0.1) between the layers (i.e., $n_{1x} \neq n_{2x}$ and $n_{1y} \neq n_{2y}$, where $n_{1x}$ and $n_{1y}$ are the in-plane refractive indices of the first optical layers and $n_{2x}$ and $n_{2y}$ are the in-plane refractive indices of the second optical layers). In polarizer applications, the multilayer optical body typically includes first and second layers where one of the in-plane refractive indices differs substantially between the layers and the other in-plane refractive index is substantially similar (e.g., $n_{1x} \neq n_{2x}$ and $n_{1y} \approx n_{2y}$). Preferably, the substantially similar in-plane refractive indices differ by no more than about 0.04. For polarizer applications, the in-plane birefringence of the first optical layers is typically at least about 0.05, preferably at least about 0.15, and more preferably at least about 0.2.

The first optical layers 12 are made using birefringent polymers (preferably, polymers with positive birefringence) that are uniaxially- or, preferably, biaxially-oriented to increase the in-plane refractive index (or indices) of the first optical layers, thereby increasing the difference between the refractive indices of the first and second layers. In some embodiments, the second optical layers 14 are polymer layers that are birefringent (preferably, negatively birefringent) and uniaxially- or biaxially-oriented. In other embodiments, the second optical layers 14 are polymer layers having an isotropic index of refraction (e.g., substantially the same index of refraction in all directions) that is typically different from one or both of the in-plane indices of refraction of the first optical layers 12. Although, the present invention will be exemplified using optical bodies 10 with second optical layers 14 that have an isotropic index of refraction, the principles and examples described herein can be applied to multilayer optical bodies with second optical layers 14 that are birefringent.

The first optical layers 12 can be made birefringent by, for example, stretching the first optical layers 12 in a desired direction or directions. For example, the first optical layers 12 can be biaxially-oriented by stretching in two different directions. The stretching of optical layers 12 in the two directions can result in a net symmetrical or asymmetrical stretch in the two chosen orthogonal axes. Symmetrical stretching in two directions can yield in-plane refractive indices that are substantially similar (e.g., differ by no more than 0.4). As an alternative to stretching in two directions, the first optical layers 12 can be uniaxially-oriented by, for example, stretching the layers in a single direction. A second orthogonal direction may be allowed to neck (e.g., decrease in length, width, or thickness) into some value less than its original length. The direction of stretching typically corresponds to either in-plane axis (e.g. the x or y axis), however, other directions can be chosen.

Typically, the highest reflectivity for a particular interface between first and second optical layers occurs at a wavelength corresponding to twice the combined optical thickness of the pair of optical layers 12, 14. The optical thickness describes the difference in path length between light rays reflected from the lower and upper surfaces of the pair of optical layers. For light incident at 90 degrees to the plane of the optical film (normally incident light), the optical thickness of the two layers is $n_1 d_1 + n_2 d_2$ where $n_1$, $n_2$ are the in-plane indices of refraction of the two layers and $d_1$, $d_2$ are the thicknesses of the corresponding layers. The equation $\lambda/2 = n_1 d_1 + n_2 d_2$ can be used to tune the optical layers for normally incident light. At other angles, the optical distance depends on the distance traveled through the layers (which is larger than the thickness of the layers) and the indices of refraction for at least two of the three optical axes of the layer. The optical layers 12, 14 can each be a quarter wavelength thick or the optical layers 12, 14 can have different optical thicknesses, as long as the sum of the optical thicknesses is half of a wavelength (or a multiple thereof). A multilayer optical body having more than two optical layers can include optical layers with different optical thicknesses to provide reflectivity over a range of wavelengths. For example, a multilayer optical body can include pairs or sets of layers that are individually tuned to achieve optimal reflection of normally incident light having particular wavelengths or may include a gradient of layer pair thicknesses to reflect light over a larger bandwidth.

These multilayer optical bodies can be designed to reflect one or both polarizations of light over at least one bandwidth. The layer thicknesses and indices of refraction of the optical stacks within the optical bodies can be controlled to reflect at least one polarization of specific wavelengths of light (at a particular angle of incidence) while being transparent over other wavelengths. Through careful manipulation of these layer thicknesses and indices of refraction along the various optical body axes, the multilayer optical body of the present invention may be made to behave as mirrors or polarizers over one or more regions of the spectrum.

For example, the optical bodies can be designed to reflect light over substantially all of the visible light region (about 400 to 750 nm) to form a visible mirror. The visible mirror may be a cold mirror, reflecting only the visible wavelengths of light and transmitting the IR, or it may be a broadband mirror that reflects both the visible and IR wavelengths. Visible mirrors are described, for example, in U.S. Pat. No. 5,882,774 and WO 97/01774, and a cold mirror is described, for example, in U.S. Pat. Nos. 5,339,198 and 5,552,927, all of which are incorporated herein by reference. For cold mirrors, the typical optical layer thickness is in the range of 100 to 200 nm. For visible/IR mirrors, the typical optical layer thickness is in the range of 100 to 600 nm (for a ¼ wavelength design).

Another embodiment is an optical body that reflects at least a portion of infrared (IR) light. To reflect light in the region from about 750 to 1200 nm, the layers have optical thicknesses ranging from about 185–300 nm (¼ the wavelength of the light desired to be reflected). For example, the optical bodies of the present invention can be tuned to reflect both polarizations of light in at least a portion of the IR region of the spectrum while being transparent over other portions of the spectrum. This type of optical body can be used as an IR film to, for example, reflect solar energy from, for example, windows of buildings and automobiles. Preferably, It films for these uses transmit a large portion of the visible light and, more preferably, have substantially uniform transmission spectra over the visible range to avoid the appearance of color. Further description of IR films and examples of film configurations are presented in WO 97/01778, WO 99/36808, and U.S. Pat. No. 5,360,659, all of which are incorporated herein by reference.

Yet another embodiment is a multilayer optical body that reflects light over only a portion of the visible range. These optical bodies can be used as color shifting films, because as viewing angle changes, the wavelength region of reflection also changes. Further description of color changing films, principles of operation, and examples of film configurations are presented in WO 99/36257 and WO 99/36258, both of which are incorporated herein by reference. These optical bodies can be tailored to exhibit a sharp bandedge at one or both sides of at least one reflective bandwidth, thereby giving a high degree of color saturation at acute angles, if desired, as described in WO 99/36809, incorporated herein by reference.

First Optical Layers

The first optical layers 12 are typically orientable films of polyethylene naphthalate (PEN), polyethylene terephthalate (PET), or copolymers or blends thereof. Examples of suitable copolymers are described in, for example, WO 99/36262, and in co-pending U.S. patent application Ser. No. 09/399,531, both of which are incorporated herein by reference. Other suitable materials for the first optical layers include other polyesters, including for example, polycarbonate, polyarylate, and naphthalate and terephthalate-containing polymers, such as, for example, polybutylene naphthalate (PBN), polypropylene naphthalate (PPN), polybutylene terephthalate (PBT), and polypropylene terephthalate (PPT), and blends or copolymers of any of the above with each other or with non-polyester polymers.

Preferred properties of the material used for the first optical layers include: 1) birefringence (preferably, positive birefringence), 2) thermal stability, 3) processing temperatures compatible with the materials of the second optical layers, 4) UV stable or protectable, 5) high clarity (e.g., high transmission and low absorption), 6) a glass transition temperature that is compatible with the second optical layers to provide strain-induced birefringence, 7) a range of viscosities to permit viscosity matching with the materials of the second optical layers, 8) good interlayer adhesion with the second optical layers, 9) low dispersion, 10) good z-index matching with the second optical layers, and 11) drawability (e.g., the ability to be stretched). Other factors include cost and commercial availability.

PEN, PET, and copolymers and blends of PEN and PET, as well as the other polymers listed above, can be made birefringent by, for example, stretching the first optical layers 12 in a desired direction or directions. Orientation is typically accomplished at a temperature above the glass transition temperature of the polymer, although some copolymers with low crystallinity can be oriented at or below the glass transition temperature as described in, for example, co-pending U.S. patent application Ser. No. 09/399,531, incorporated herein by reference.

Polyethylene naphthalate (PEN) can have a relatively large birefringence upon orientation. For example, uniaxial orientation of PEN can raise the refractive index of PEN in the orientation direction from 1.64 to 1.88. Biaxial orientation of PEN can raise the refractive index of PEN in the orientation directions from 1.64 to 1.75, while the z index of refraction decreases to 1.49, giving a birefringence of 0.24 to 0.26 between the in-plane and z-axis refractive indices.

Uniaxial orientation of polyethylene terephthalate (PET) can raise the refractive index of PET in the orientation direction from 1.57 to 1.69. Biaxial orientation of PET can raise the refractive index of PET in the orientation directions from 1.57 to 1.65, while the z index of refraction decreases to 1.50, giving a birefringence of 0.13 to 0.15 between the in-plane and z-axis refractive indices.

The amount of birefringence and the amount of change in refractive index obtained for these polymers depends on a variety of factors including, for example, the draw ratio, the orientation temperature, and whether the polymer is uniaxially or biaxially oriented. Typically, the larger the draw ratio, the larger the change in refractive index. However, the achievable draw ratio can be limited by the orientation temperature.

Typically, for relatively crystalline materials, the orientation temperature is above the glass transition temperature. Generally, the closer that the orientation temperature is to the glass transition temperature, the lower the achievable draw ratio because the polymer exhibits excessive strain hardening when drawn and can crack or form microvoids. However, in general, the closer that the orientation temperature is to the glass transition temperature, the larger the change in refractive index for a given draw ratio. Thus, drawing the polymer at a temperature that is substantially above (e.g., 20° C. or 30° C.) the glass transition temperature of the polymer will typically result in significantly less change in the refractive index for a given draw ratio. Thus, a balance is required between draw ratio and orientation temperature to achieve a desired refractive index change.

Material selection can influence the optical and physical properties of the multilayer optical body. Polyesters, like PEN and PET, include carboxylate and glycol subunits and can be generated by, for example, (a) reaction of carboxylate monomers with glycol monomers or (b) transesterification. Each carboxylate monomer has two or more carboxylic acid or ester functional groups and each glycol monomer has two or more hydroxy functional groups. Polyesters can be formed using a single type of carboxylate monomer or two or more different types of carboxylate monomers. The same applies to the glycol monomers. Also included within the term "polyester" are polycarbonates which are derived from the reaction of glycol monomers with esters of carbonic acid.

The properties of a polymer layer or film vary with the particular choice of monomers. PEN includes carboxylate subunits formed from 2,6-naphthalene dicarboxylic acid or esters thereof and PET includes carboxylate subunits formed from terephthalic acid or esters thereof. Suitable carboxylate comonomers for forming the carboxylate subunits of copolyesters of PEN and PET include, for example, 2,6-naphthalene dicarboxylic acid and isomers thereof; terephthalic acid; isophthalic acid; phthalic acid; azelaic acid; adipic acid; sebacic acid; norbornene dicarboxylic acid; bi-cyclooctane dicarboxylic acid; 1,6-cyclohexane dicarboxylic acid and isomers thereof; t-butyl isophthalic acid; tri-mellitic acid; sodium sulfonated isophthalic acid; 2,2'-biphenyl dicarboxylic acid and isomers thereof; and lower alkyl esters of these acids, such as methyl or ethyl esters. The term "lower alkyl" refers, in this context, to C1–C10 straight-chained or branched alkyl groups.

Both PEN and PET include glycol subunits formed using ethylene glycol. Suitable glycol comonomers for forming glycol subunits of copolyesters of PEN and PET include propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; norbornanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis(2-hydroxyethoxy)benzene.

Multilayer optical bodies can also be formed using polyethylene terephthalate (PET). PET has a lower refractive index than PEN, but PET is much less expensive (currently about one eighth the cost of PEN). Despite the lower refractive index of PET, the ratio of optical power (the square of the difference between the in-plane refractive indices of the first and second optical layers) and cost currently favors PET over PEN and other materials, such as polycarbonate.

Figure 3:
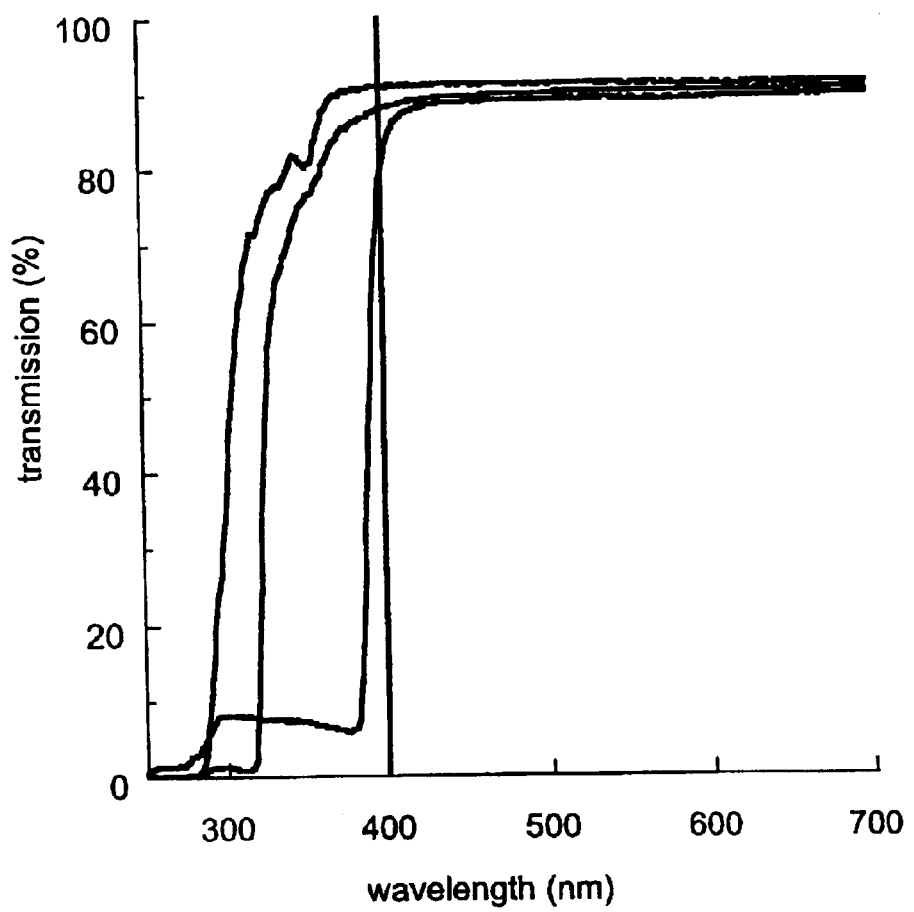
FIG. 3 is a graph of the transmission spectra for polycarbonate, polyethylene terephthalate, and polyethylene naphthalate.

Moreover, PET and PET-containing films can be more easily protected from ultraviolet (UV) degradation than PEN without introducing color into the UV-protected optical body. FIG. 3 illustrates the transmission spectra of PEN, PET, and polycarbonate. PEN absorbs light at 380 nm with an absorption tail extending into the visible region of the spectrum to about 410 nm. A UV protective coating or additive for an optical body made using PEN would typically extend into the visible range, which may give the optical body a yellowish color (due to absorption of blue light).

On the other hand, PET absorbs light at 320 nm with a tail extending to 370 nm. Thus, a UV protecting coating or additive would not need to extend into the visible range. This ability is particularly important when preparing multilayer optical bodies that are designed to reflect IR light and transmit visible light (e.g., solar reflective films for building and automobile windows) or optical bodies designed to reflect only a particular bandwidth in the visible range and transmitting all other light.

Furthermore, the lower refractive index and lower dispersion of PET can be advantageous in at least some respects. For example, clarity or transparency of an IR film can be essential, particularly for architectural and automotive applications. Because of the lower refractive index difference of PET relative to PEN, a PET-based multi layer optical body can have less iridescence and spectral nonuniformities because the optical spectrum is a weaker function of viewing angle. Wider IR bandwidth can also be achieved because the lower refractive index and lower dispersion in PET permits the positioning of higher order harmonics at higher wavelengths.

Another advantage, when the skin layers are made of the same material as the first optical layers, is that PET, because of its lower refractive index, will typically have lower surface reflection because of the lower refractive index mismatch between the air (or other material)/PET interface. This is particularly useful in automotive applications, where poly(vinyl butyrate) (PVB) is used to generate safe shattering windows. The refractive index of PVB is closer to PET than PEN, thereby reducing glare.

Suitable PET-containing multilayer optical bodies can be formed in a variety of configurations. Particularly useful PET-based materials include PET or PET copolymers or blends that have a glass transition temperature of no more than about 90° C., or of no more than about 80° C. or 70° C. Typically, the most useful of these PET-based materials will be free, or substantially free, of naphthalene dicarboxylate (NDC) monomers. In such constructions, the material for the second optical layers generally will also include a material having a glass transition temperature of no more than about 90° C. Among the materials for suitable second optical layers are polyacrylates and aliphatic polyolefins, including blends of these polymers with other materials and copolymers. Alternatively, the first optical layers can be formed using a copolymer or blend of PET that is also substantially free of NDC monomer and that has a glass transition temperature of at least about 100° C. or at least 120° C. In such constructions, the material for the second optical layers generally will also include a material having a glass transition temperature of at least about 100° C.

As an alternative, the glass transition temperature of PET can be raised by combining PET with a second polymer that has a higher glass transition temperature. The combination of PET and the second polymer can include miscible blending to form a polymer blend or reactive blending (by, for example, transesterification) to form a copolymer. For example, PET can be blended with a second polymer that has a glass transition temperature of 130° C. or higher or a second polymer with a glass transition temperature of 160° C. or higher, or even a second polymer with a glass transition temperature of 200° C. or higher. Examples of suitable second polymers include, for example, PEN ($T_g$=130° C.), polycarbonate ($T_g$=157° C.), polyarylate ($T_g$=193° C.), or polyetherimide ($T_g$=218° C.).

Alternatively, the monomer materials of PET, e.g., terephthalic acid and ethylene glycol, can be copolymerized with the monomer materials that correspond to a second is polymer having a higher glass transition temperature, such as PEN, polycarbonate, and polyarylate, to form copolymers. For example, PET can be copolymerized with monomer materials that correspond with a second polymer that has a glass transition temperature of 130° C. or higher or a second polymer with a glass transition temperature of 160° C. or higher, or even a second polymer with a glass transition temperature of 200° C. or higher.

Other copolymers of PET can also be used, including those incorporating (i) carboxylate monomer materials, such as, for example, isophthalic acid; phthalic acid; azelaic acid; adipic acid; sebacic acid; norbornene dicarboxylic acid; bi-cyclooctane dicarboxylic acid; 1,6-cyclohexane dicarboxylic acid and isomers thereof; t-butyl isophthalic acid; tri-mellitic acid; sodium sulfonated isophthalic acid; 2,2'-biphenyl dicarboxylic acid and isomers thereof; and lower alkyl esters of these acids, such as methyl or ethyl esters; and (ii) glycol monomer materials, such as, for example, propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; norbornanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis(2-hydroxyethoxy)benzene.

At least some of these materials, such as the copolymers of PET and PEN, have lower processing temperatures than PET and can be more effectively used with second optical layer materials, such as EVA, that degrade at PET processing temperatures.

Second Optical Layers

The second optical layers 14 can be prepared with a variety of optical and physical properties depending, at least in part, on the desired operation of the film 10. Preferred properties of the second optical layers include, for example, 1) isotropic or negative birefringence, 2) thermal stability, 3) processing temperatures compatible with the materials of the first optical layers, 4) UV stable or protectable, 5) high clarity (e.g., high transmission and low absorption), 6) a glass transition temperature that is compatible with the first optical layers to provide strain-induced birefringence, 7) a range of viscosities to permit viscosity matching with the materials of the first optical layers, 8) good interlayer adhesion with the first optical layers, 9) low dispersion, 10) good z-index matching with the first optical layers, and 11) drawability (e.g., the ability to be stretched). Other factors include cost and commercial availability.

In some embodiments, the second optical layers 14 are made of a polymer material that does not appreciably optically orient when stretched under conditions that are used to orient the first optical layers 12. Such layers are particularly useful in the formation of reflective optical bodies, because they allow the formation of a stack 16 of layers by, for example, coextrusion, which can then be stretched to orient the first optical layers 12 while the second optical layers 14 remain relatively isotropic (e.g., an in-plane birefringence of 0.05 or less). In other embodiments, the second optical layers 14 are orientable and are, preferably, negatively birefringent (when the first optical layers are positively birefringent) so that the in-plane refractive indices decrease with orientation.

There are a variety of considerations in the selection of the materials for the first and second optical layers. The importance of these considerations typically depends on the desired optical properties and uses for the optical bodies. One consideration is the glass transition temperature of the second optical layers. Typically, the materials of the first and second optical layers are selected so that the glass transition temperature of the second optical layers is not substantially higher than the glass transition temperature of the first optical layers. More preferably, the glass transition temperature of the second optical layers is equal to or less than the glass transition temperature of the first optical layers. If the glass transition temperature of the second optical layers is too high, orientation of the first optical layers at a suitable orientation temperature near the glass transition temperature of the first optical layers can cause excessive strain hardening in the second optical layers. This can diminish the optical quality of the second optical layers by, for example, introducing cracks or microvoids. The glass transition temperature of an optical layer is defined as the glass transition temperature of the composition that is used to form the optical layer and not the glass transition temperature(s) of the individual components.

Another consideration is the difference in the z-axis refractive indices between the first and second optical layers. When the z-axis refractive indices of the two layers are equal, the reflectance of p-polarized light does not depend on the incident angle of light. This feature can be useful when reflectance uniformity over a range of viewing angles is desired. In such embodiments, the difference in z-axis refractive indices between the first and second optical layers is preferably no more than about 0.04 and, by selection of materials can be made no more than about 0.02 or no more than about 0.01.

Another consideration is the decomposition temperature of the polymer(s) selected for use in the second optical layers. Typical coextrusion processing temperatures for PEN and PET are above about 250° C. Degradation of the components of the second optical layers can produce defects in the optical body, such as, for example, discoloration and regions of gel formation. Materials that do decompose at the processing temperatures can still be used if the decomposition does not result in unacceptable properties.

The second optical layers 14 can be made using a variety of polymeric compositions. The description of suitable polymers with respect to particular optical body configurations is provided below.

Multilayer optical bodies have been made using PEN as the first optical layer and polymethyl methacrylate (PMMA) as the second optical layer. While PMMA has been found to have a number of properties such as clarity and viscosity that make it useful as a low refractive index material for multilayer films, some characteristics of PMMA have limited its usefulness. In particular, the relatively high refractive index (n=1.49) and glass transition temperature ($T_g$=106° C.) have limited the choice of materials that can be used in the first optical layers. For example, while PMMA can be used with PEN, its glass transition temperature makes it unsuitable in many applications for processing with PET, and its refractive index is not sufficiently low to create the difference in refractive indices with PET that is desired for many applications. The use of PET instead of PEN can be desirable due to the susceptibility of PEN to UV degradation and the resultant need to provide additional UV protection when PEN is used.

One aspect of this invention utilizes polymethylmethacrylate/polyvinylidene fluoride blends (PMMA/PVDF) in the second optical layers as low refractive index materials. The PMMA/PVDF blends are particularly useful with polyester high refractive index materials, for example aromatic polyesters such as polyethylene terephthalate (PET) and polyethylene naphthalate (PEN), as well as blends and copolymers thereof.

The polymers used in multilayer optical films should be clear so that light is not lost by scattering or absorption. Many applications involve multiple interactions between light and the optical film, which magnify the adverse affects of scattering and absorption. Optical polymers such as PMMA are considered sufficiently clear for most purposes, with transmission in the visible region of the spectrum at 92%. PVDF has a transmission of 96%. PMMA/PVDF miscible blends have higher transmission (clarity) than PMMA.

PMMA/PVDF miscible blends have a lower refractive index than PMMA (n=1.49) due to the low index of PVDF (n=1.42). The larger index difference results in greater optical power in the multilayer film. The refractive index for a PMMA/PVDF(60/40) (by weight) miscible blend is about 1.458. The larger index difference provided by the PMMA/PVDF blend relative to PMMA also results in a significant dampening of color leaks as well as higher reflectivity.

Multilayer films using either PEN or PET require high coextrusion temperatures (greater than or equal to about 250° C.) due to the high melting points of these polyesters. Second optical layers that are not thermally stable can cause flow instabilities in the multilayer film due to viscosity loss associated with degradation. Degradation products also may result in point defects or discoloration in the optical film. PMMA/PVDF miscible blends are more thermally stable than PMMA.

Use of PMMA/PVDF miscible blends in place of PMMA in the second optical layers permits a wider variety of materials for the first optical layers because of the lower glass transition temperature ($T_g$) of the blends. For example, PMMA/PVDF blends enable the use PET or copolymers of PET in the first optical layers of multilayer optical bodies. PET has several advantages relative to PEN in multilayer optical bodies including easier UV protection and PET is a less expensive raw material. When a cast multilayer optical body is stretched near the $T_g$ of the high index material, the orientation near the $T_g$ results in a high degree of stress birefringence and thus a high refractive index for PEN (or PET) in the direction of stretch. PEN:PMMA multilayer films are orientable near the $T_g$ of PEN because the $T_g$ of PMMA ($T_g$=106° C.) is lower than that of PEN ($T_g$=123° C.). PET:PMMA are not orientable near the $T_g$ of PET because of the high $T_g$ of PMMA relative to PET ($T_g$=84° C.). Blending as little as 25% (by weight) PVDF to PMMA depresses the $T_g$ of PMMA, PMMA/PVDF(75/25) ($T_g$=72° C.), enabling the use of PET in the first optical layers.

Thus, by blending PVDF with PMMA, a low refractive index material (for the second optical layers) with improved properties is achieved. Such blends have a lower refractive index and a lower glass transition temperature as compared to PMMA, while at least maintaining suitable performance in properties such as clarity, viscosity, thermal stability and interlayer adhesion. In particular, the blends, when coextruded with PEN or PET or blends or copolymers thereof) as the high refractive index material (for the first optical layers), exhibit properties such as excellent clarity (e.g. transmission>90%), low refractive index ($n \leq 1.49$), viscosity similar to that of the high refractive index material, thermal stability at temperatures greater than 250° C., glass transition temperature ($T_g$) below that of the high refractive index material; and good interlayer adhesion with the high refractive index material.

As a result, the PMMA/PVDF blends can be used with conventional high refractive index materials such as PEN and achieve improved optical or physical properties. For example, due to the lowered refractive index, the use of the PMMA/PVDF blends can require fewer layers to achieve the same optical effects as a corresponding product made with PMMA in the second optical layers, or can provide enhanced effects when the same number of layers is used. The PMMA/PVDF blends also can be used with high refractive index materials such as PET and copolymers of PET that previously have not been found suitable for practical application in multilayer optical bodies. Further, the improved optical or physical properties are advantageous in permitting less strict control over processing conditions in forming the multilayer films while still achieving the desired performance. This permits more practical and cost-effective manufacturing of the multilayer optical bodies.

In particular, some of the advantages seen with the use of the PMMA/PVDF blends as low refractive index materials versus PMMA alone include (1) higher reflectivity—the greater difference in refractive index yields greater reflectivity for a given number of layers; (2) reduction of spectral non-uniformity or iridescence (which often results from processing difficulties such as layer non-uniformity)—again due to the larger difference in refractive index—thereby providing optical benefits and processing benefits; (3) increased efficiency in applications requiring multiple reflections; (4) wider processing tolerances such as crossweb caliper uniformity requirements and lack of optical packet overlap; (5) thinner film requirements for a given reflectivity; (6) more options for high refractive index materials; (7) improved performance in thermoforming, embossing and the like due to lower $T_g$ and (8) easier UV protection because high refractive index materials with reduced levels of PEN can be used.

The particular PMMA and PVDF used in the blends to provide a low refractive index material are not limited so long as the materials are sufficiently miscible with each other and the resultant blend can be coextruded with the high refractive index material to form the multilayer film. For example, PMMA sold under the designations Perspex™ CP80 and CP82 by ICI Americas, Inc. (Wilmington, Del.) and PVDF sold under the designation Solef™ 1008/0001 by Solway are useful with PET and PEN high refractive index materials.

The amount of PVDF used in the blends is typically not more than about 40% by weight (i.e. a 60/40 PMMA/PVDF blend). With higher levels of PVDF, the miscibility of the PMMA and PVDF tends to deteriorate, thereby causing losses in clarity. In general, it is desirable to use PVDF in the blends in an amount as high as possible in order to increase the benefit in reductions in refractive index and glass transition temperature. However, smaller amounts can be used when it is desired to fine tune the composition to provide particular optical or physical properties for certain applications. For example, a 75/25 blend provides highly desirable physical and optical properties for use with high refractive index materials such as PEN, PET and mixtures or copolymers thereof.

As indicated above, polymethyl methacrylate (PMMA) is a useful material for forming the optical bodies. However, the glass transition temperature of PMMA is about 106° C., which is significantly higher than the glass transition temperature of PET ($T_g$ is about 84° C.). An optical body with first optical layers of PET and second optical layers of PMMA would be oriented at a temperature above the glass transition temperature of PMMA, significantly reducing the refractive index change expected for orientation of PET.

As described above, the blending of polyvinylidene fluoride (PVDF) with PMMA reduces the glass transition temperature of the blended polymers. Preferably, the blend includes about 20 to 40 wt. % PVDF and 60 to 80 wt. % PMMA. Below about 20 wt. % PVDF, the glass transition temperature is above that of PET, although these blends are still acceptable for some applications. Above about 40 wt. %, PVDF crystallizes. The addition of PVDF to the second optical layers can also enhance other properties, such as, for example, solvent resistance.

As another option, copolymers of PMMA can be made using comonomers that depress the glass transition temperature of the copolymer below the glass transition temperature of PMMA. Suitable comonomers include other acrylate and methacrylate monomers including, for example, ethyl acrylate, butyl acrylate, n-butyl methacrylate, ethyl methacrylate, methacrylic acid, or combinations thereof. Other acrylate monomers can be used so long as the desired glass transition temperature, thermal stability, drawability, and refractive index properties are achieved. The ratio of monomers are selected to achieve the desired glass transition temperature, thermal stability, drawability, and refractive index properties. The comonomers can also provide other advantages including, for example, improved interlayer adhesion, increasing or decreasing the refractive index difference between the first and second layers, modifying the melt rheology behavior of the PMMA, or modifying the orientation behavior of the PMMA.

As yet another option, second optical layers can be formed using PMMA and a plasticizer that decreases the glass transition temperature of the second optical layers. Suitable plasticizers include, for example, phosphoric acid derivatives (e.g., triphenyl phosphate), phthalic acid derivatives (e.g., butyl benzyl phthalate and diisodecyl phthalate), terephthalic acid derivatives (e.g., di-2-ethylhexyl terephthalate), adipic acid derivatives (e.g., polyester adipate), benzoic acid derivatives (e.g., glyceryl tribenzoate), sebacic acid derivatives (e.g., dimethyl sebacate and di-n-butyl sebacate), and acetic acid derivatives (e.g., glyceryl triacetate). A plasticizer can also be selected that improves other properties of the optical body including, for example, interlayer adhesion, increasing or decreasing the refractive index difference between the first and second layers, modifying the melt rheology behavior of the PMMA, or modifying the orientation behavior of the PMMA.

Instead of PMMA, other polymers can be used. For example, other acrylate polymers with glass transition temperatures lower than PMMA, including, for example, polyethyl methacrylate (PEMA), can be used.

Alternatively, aliphatic polyolefins can be used. Examples of suitable polyolefins include poly(ethylene-co-octene) (PE-PO), poly(propylene-co-ethylene) (PP-PE), a copolymer of atactic and isotactic polypropylene (aPP-iPP), maleic anhydride functionalized linear low density polyethylene (LLDPE-g-MA), and poly(ethylene-co-vinyl acetate) (EVA). Other useful polyolefins include acid-modified polyolefins such as "Bynel" polyolefins from E. I. duPont de Nemours & Co., Inc. (Wilmington, Del.), "Primacor" polyolefins from Dow Chemical Co. (Midland, Mich.), and "Admer" polyolefins from Mitsui Petrochemical Industries, Ltd. (Tokyo, Japan). One additional advantage of polyolefins is that they typically do not substantially degrade at the processing temperatures utilized with PEN and PET. In addition, the use of elastomeric polyolefins can enhance mechanical properties of the multilayer optical bodies, including, for example, tear resistance, puncture resistance, and toughness.

Non-Optical Layers

Referring again to FIGS. 1 and 2, one or more of the non-optical layers 18 can be formed as a skin layer or skin layers over at least one surface of stack 16 as illustrated in FIG. 1, to, for example, protect the optical layers 12, 14 from physical damage during processing and/or afterwards. In addition or alternatively, one or more of the non-optical layers 18 can be formed within the stack 16 of layers, as illustrated in FIG. 2, to, for example, provide greater mechanical strength to the stack or to protect the stack during processing.

The non-optical layers 18 ideally do not significantly participate in the determination of optical properties of the multilayer optical film 10, at least across the wavelength region of interest (e.g., visible, IR or UV wavelength regions). The non-optical layers 18 may or may not be birefringent or orientable. Typically, when the non-optical layers 18 are used as skin layers there will be at least some surface reflection. In at least some applications where high transmission of light is desired, the non-optical layers preferably have an index of refraction that is relatively low (e.g., no more than 1.6 or, preferably, no more than 1.5) to decrease the amount of surface reflection (e.g., iridescence). In other applications where reflectivity of light is desired, the non-optical layers preferably have a relatively high refractive index (e.g., at least 1.6, more preferably at least 1.7) to increase reflectance of the multilayer optical body.

When the non-optical layers 18 are found within the stack 16, there will typically be at least some polarization or reflection of light by the non-optical layers 18 in combination with the optical layers 12, 14 adjacent to the non-optical layers 18. In at least some instances, however, the non-optical layers 18 can be selected to have a thickness that dictates that light reflected by the non-optical layers 18 within the stack 16 has a wavelength outside the region of interest, for example, in the infrared region for optical bodies that reflect visible light. The thickness of the non-optical layers 18 can be at least two times, typically at least four times, and, in many instances, at least ten times, the thickness of one of the individual optical layers 12, 14. The thickness of the non-optical layers 18 can be varied to make an optical body 10 having a particular thickness. Typically, one or more of the non-optical layers 18 are placed so that at least a portion of the light to be transmitted, polarized, and/or reflected by the optical layers 12, 14, also travels through the non-optical layers (i.e., the non-optical layers are placed in the path of light which travels through or is reflected by the optical layers 12, 14).

The non-optical layers 18 are formed from polymers including any of the polymer used in the first and second optical layers. In some embodiments, the material selected for the non-optical layers 18 is similar to or the same as the material selected for the second optical layers 14. Materials may be chosen for the non-optical layers that impart or improve properties such as, for example, tear resistance, puncture resistance, toughness, weatherability, and solvent resistance of the multilayer optical body.

Other Layers and Coatings

Various functional layers or coatings can be added to the multilayer optical bodies of the present invention to alter or improve their physical or chemical properties, particularly along the surface of the multilayer optical body. Such layers or coatings may include, for example, slip agents, low adhesion backside materials, conductive layers, antistatic coatings or films, barrier layers, flame retardants, UV stabilizers, abrasion resistant materials, optical coatings, and/or substrates designed to improve the mechanical integrity or strength of the film or device, as described in WO 97/01440, which is herein incorporated by reference. Dichroic polarizing films can also be coated on or co-extruded with the multilayer optical films, as described, for example, in WO 95/17691, WO 99/36813, and WO 99/36814, all of which are herein incorporated by reference.

Manufacturing

A brief description of one method for forming multilayer optical bodies is provided. A fuller description of the process conditions and considerations is found in PCT Publications Nos. WO 99/36248, WO 99/06203, and WO 99/36812, all of which are incorporated herein by reference.

An initial step in the manufacture of the multilayer optical bodies is the generation of the polymers to be used in formation of the first and second optical layers, as well as the non-optical layers (unless the polymers are available commercially). Typically, these polymers are formed by extrusion, although other methods of polymer formation can be used. Extrusion conditions are chosen to adequately feed, melt, mix and pump the polymer resin feed streams in a continuous and stable manner. Final melt stream temperatures are chosen to be within a range that reduces freezing, crystallization, or unduly high pressure drops at the low end of the range and that reduces degradation at the high end of the range. The entire melt stream processing of more than one polymer, up to and including film casting on a chill roll, is often referred to as co-extrusion.

Preferably, the polymers of the first optical layers, the second optical layers, and the non-optical layers are chosen to have similar rheological properties (e.g., melt viscosities) so that they can be co-extruded. Typically, the second optical layers and the non-optical layers have a glass transition temperature, $T_g$, that is either below or no greater than about 30° C. above the glass transition temperature of the first optical layers. Preferably, the glass transition temperature of the second optical layers and the non-optical layers is below the glass transition temperature of the first optical layers.

Following extrusion, each melt stream is conveyed to a gear pump used to regulate the continuous and uniform rate of polymer flow. A static mixing unit can be used to carry the polymer melt stream from the gear pump into a multilayer feedblock with uniform melt stream temperature. The entire melt stream is typically heated as uniformly as possible to enhance both uniform flow of the melt stream and reduce degradation during melt processing.

Multilayer feedblocks divide each of the two or more polymer melt streams into many layers, interleave these layers, and combine the many layers into a single multilayer stream. The layers from any given melt stream are created by sequentially bleeding off part of the stream from a main flow channel into side channel tubes which lead to layer slots in the feed block manifold. The layer flow can be controlled by choices made in machinery, as well as the shape and physical dimensions of the individual side channel tubes and layer slots.

The side channel tubes and layer slots of the two or more melt streams are often interleaved to form alternating layers. The feedblock's downstream-side manifold is typically shaped to compress and uniformly spread the layers of the combined multilayer stack transversely. Thick, non-optical layers, known as protective boundary layers (PBLs), can be fed near the manifold walls using the melt streams of the optical multilayer stack, or by a separate melt stream. As described above, these non-optical layers can be used to protect the thinner optical layers from the effects of wall stress and possible resulting flow instabilities.

The multilayer stack exiting the feedblock manifold enters a final shaping unit such as a die. Alternatively, the stream can be split, preferably normal to the layers in the stack, to form two or more multilayer streams that can be recombined by stacking. The stream can also be split at an angle other than normal to the layers. A flow channeling system that splits and stacks the streams is called a multiplier. The width of the split streams (i.e., the sum of the thicknesses of the individual layers) can be equal or unequal. The multiplier ratio is defined as the ratio of the wider to narrower stream widths. Unequal stream widths (i.e., multiplier ratios greater than unity) can be useful in creating layer thickness gradients. In the case of unequal stream widths, the multiplier may spread the narrower stream and/or compress the wider stream transversely to the thickness and flow directions to ensure matching layer widths upon stacking.

Prior to multiplication, additional non-optical layers can be added to the multilayer stack. These non-optical layers may perform as PBLs within the multiplier. After multiplication and stacking, some of these layers can form internal boundary layers between optical layers, while others form skin layers.

After multiplication, the web is directed to a final shaping unit. The web is then cast onto a chill roll, sometimes also referred to as a casting wheel or casting drum. This casting is often assisted by electrostatic pinning, the details of which are well-known in the art of polymer film manufacture. The web can be cast to a uniform thickness across the web or a deliberate profiling of the web thickness can be induced using die lip controls.

The multilayer web is then uniaxially or biaxially drawn to produce the final multilayer optical film. Uniaxial drawing is performed in a tenter or a length orienter. Biaxial drawing typically includes both types of equipment. Typical tenters draw in a transverse direction (TD) to the web path, although certain tenters are equipped with mechanisms to draw or relax (shrink) the film dimensionally in the web path or machine direction (MD). Length orienters draw in the machine direction.

For example, a two step drawing process is used to orient the birefringent material in both in-plane directions. The draw processes can be any combination of the single step processes described above that allow drawing in two in-plane directions. In addition, a tenter that allows drawing along the machine direction, e.g. a biaxial tenter which can draw in two directions sequentially or simultaneously, can be used. In this latter case, a single biaxial draw process can be used.

The following examples demonstrate the manufacture and uses of multilayer optical films of the invention. It is to be understood that these examples are merely illustrative and are in no way to be interpreted as limiting the scope of the invention.

EXAMPLES

Monomers, catalysts, and stabilizers utilized in creating polymers for these examples are commercially available from the following suppliers: dimethyl naphthalene dicarboxylate from Amoco (Decatur, Ala.), dimethyl terephthalate from Hoechst Celanese (Dallas, Tex.), ethylene glycol from Union Carbide (Charleston, W.Va.), 1,6-hexanediol from BASF (Charlotte, N.C.), antimony triacetate from Elf Atochem (Philadelphia, Pa.), manganese acetate and triethyl phosphonoacetate, both from Albright & Wilson (Glen Allen, Va.).

The polyethylene terephihalate used in the following Examples can be synthesized in a batch reactor with the following raw material charge; 5,000 kg dimethyl terephthalate, 3,502 kg ethylene glycol, 1.2 kg manganese acetate, and 1.6 kg antimony triacetate. Under pressure of 1520 torr, this mixture is heated to 254° C. while removing the transesterification reaction by-product methanol. After 1,649 kg of methanol was removed, 2.45 kg of triethyl phosphonoacetate is charged to the reactor and then the pressure is gradually reduced to 1 torr while heating to 280° C. The condensation reaction by-product, ethylene glycol, is continuously removed until a polymer with an Intrinsic Viscosity of 0.60, as measured in 60/40 phenol/dichlorobenzene, is produced.

Example 1

Color-shifting Optical Film with PET:MMA-EA Layers.

An optical film was constructed with first optical layers created from polyethylene terephthalate (PET) and second optical layers created from a copolymer using 75 wt. % methylmethacrylate (MMA) monomers and 25 wt. % of ethyl acrylate (EA) monomers. The copolymer is available under the product designation "Perspex™ CP63" from ICI Americas, Inc. (Wilmington, Del.).

The above described polymers were then coextruded through a multilayer melt manifold to create a multilayer film with 224 alternating first and second optical layers of a total thickness of about 580 $\mu$m. This particular multilayer reflective film also contained external protective layers made of the same polyethylene terephthalate as the first optical layers approximately 145 $\mu$m thick on each side. The optical film was initially preheated, then stretched in the machine direction to a ratio of 3.7:1 at approximately 85° C., and then stretched in the transverse direction to a ratio of 3.9:1 at approximately 95° C. to produce an optical film of approximately 48 $\mu$m thickness.

The PET first optical layers were oriented by the process as determined by refractive index measurement of the external protective PET layers ($n_{MD}$=1.6433, $n_{TD}$=1.6757, $n_z$=1.4868). The second optical layers were essentially isotropic with a refractive index of about 1.49.

Figure 4:
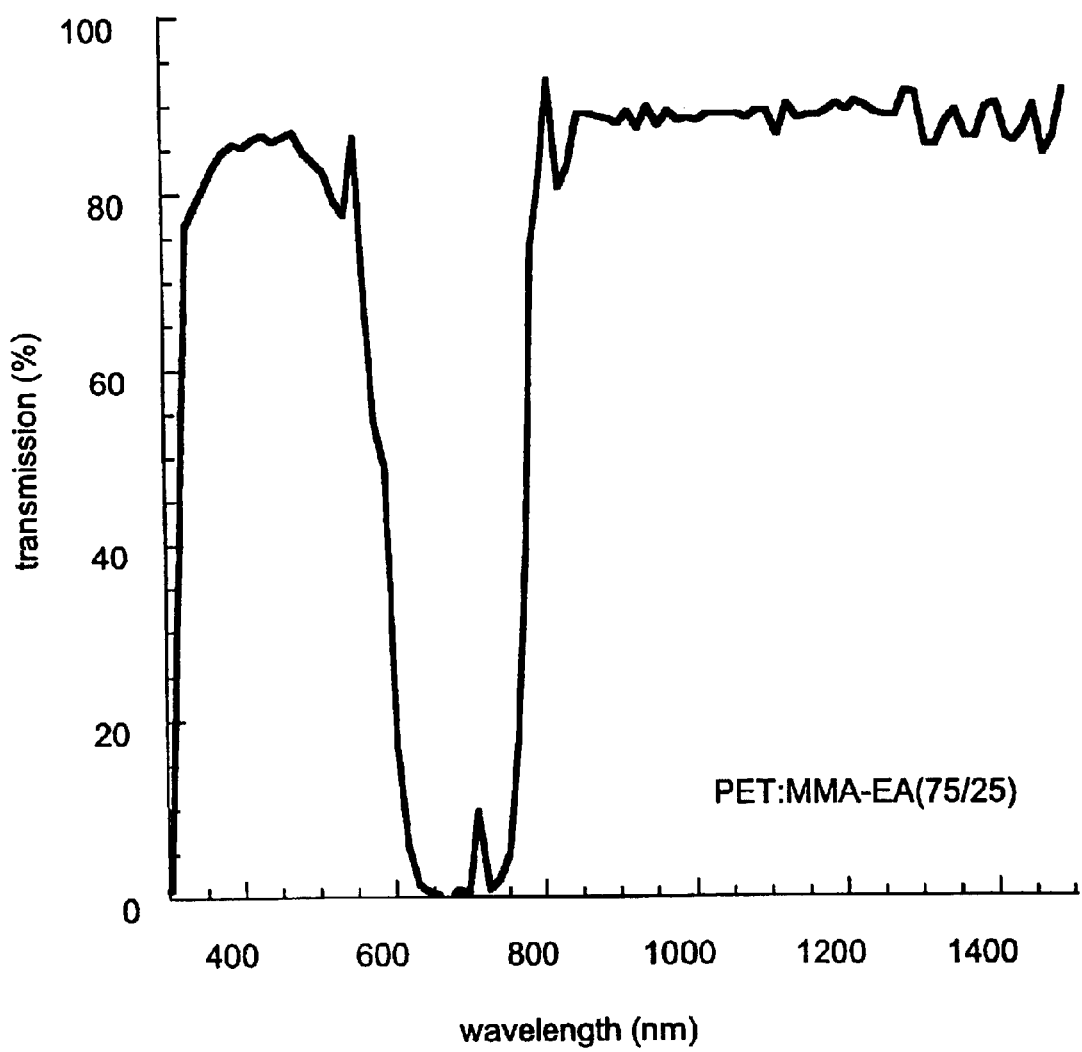
FIG. 4 is the transmission spectrum for the optical film of Example 1.

The optical film had the transmission spectrum illustrated in FIG. 4 for normally incident light. The optical film had a blue appearance that changed to red as the viewing angle increased with respect to normal incidence.

Example 2

Color-Shifting Optical Film with PET:MMA-EA Layers. This optical film was made in the same way as the optical film of Example 1, except that during the drawing process, the optical film was initially preheated to 94° C. for 1 minute, then biaxially stretched at a 3.4:3.4 ratio at 94° C. at a draw rate of 20%/s.

The PET first optical layers were oriented by the process as determined by refractive index measurement of the external protective PET layers ($n_{MD}$=1.6173, $n_{TD}$=1.6197, $n_z$=1.5108). The second optical layers were essentially isotropic with a refractive index of about 1.49.

Figure 5:
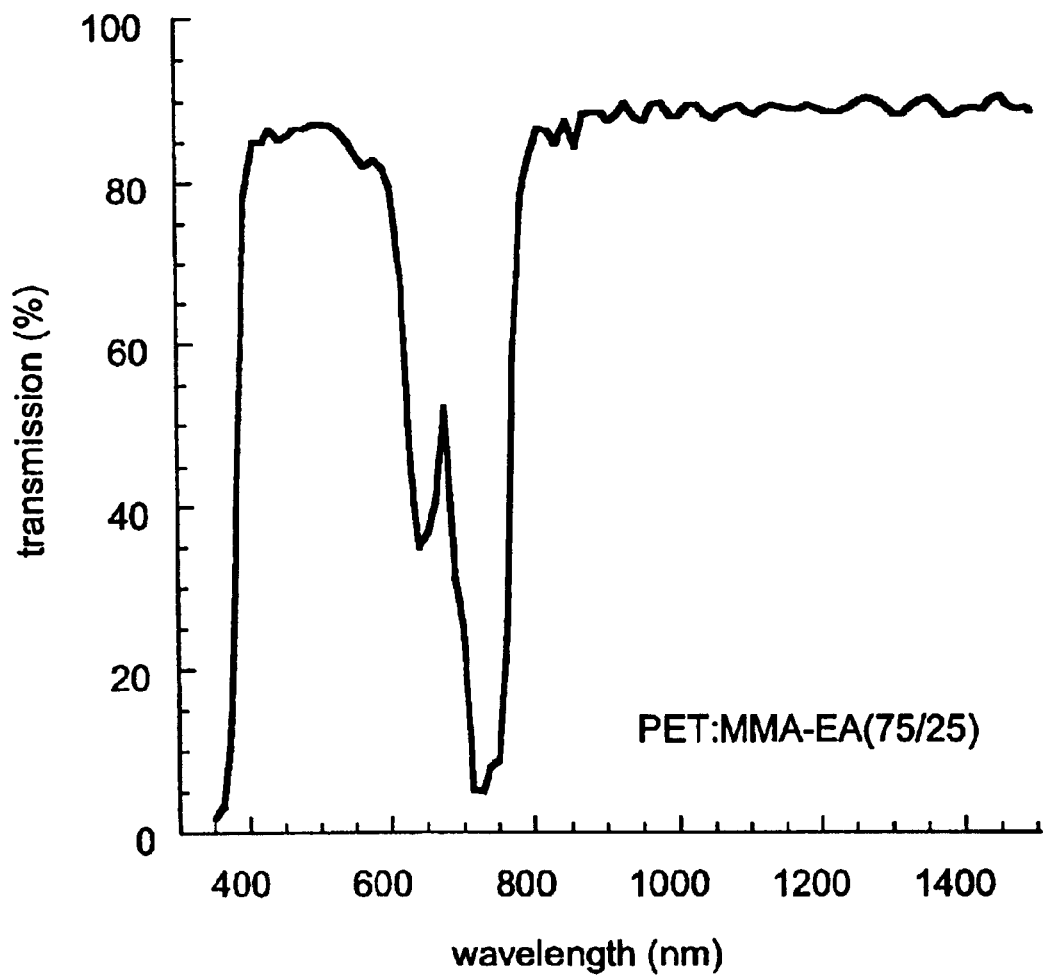
FIG. 5 is the transmission spectrum for the optical film of Example 2.

The optical film had the transmission spectrum illustrated in FIG. 5 for normally incident light. The optical film had a blue appearance that changed to red as the viewing angle increased with respect to normal incidence.

Example 3

Color-Shifting Optical Film with PET:MMA-EA Layers. This optical film was made in the same way as the optical film of Example 1, except that during the drawing process, the optical film was initially preheated to 84° C. for 1 minute, then biaxially stretched at a 2.4:2.4 ratio at 84° C. at a draw rate of 20%/s.

The PET first optical layers were oriented by the process as determined by refractive index measurement of the external protective PET layers ($n_{MD}$=1.6121, $n_{TD}$=1.6107, $n_z$=1.5200). The second optical layers were essentially isotropic with a refractive index of about 1.49.

Figure 6:
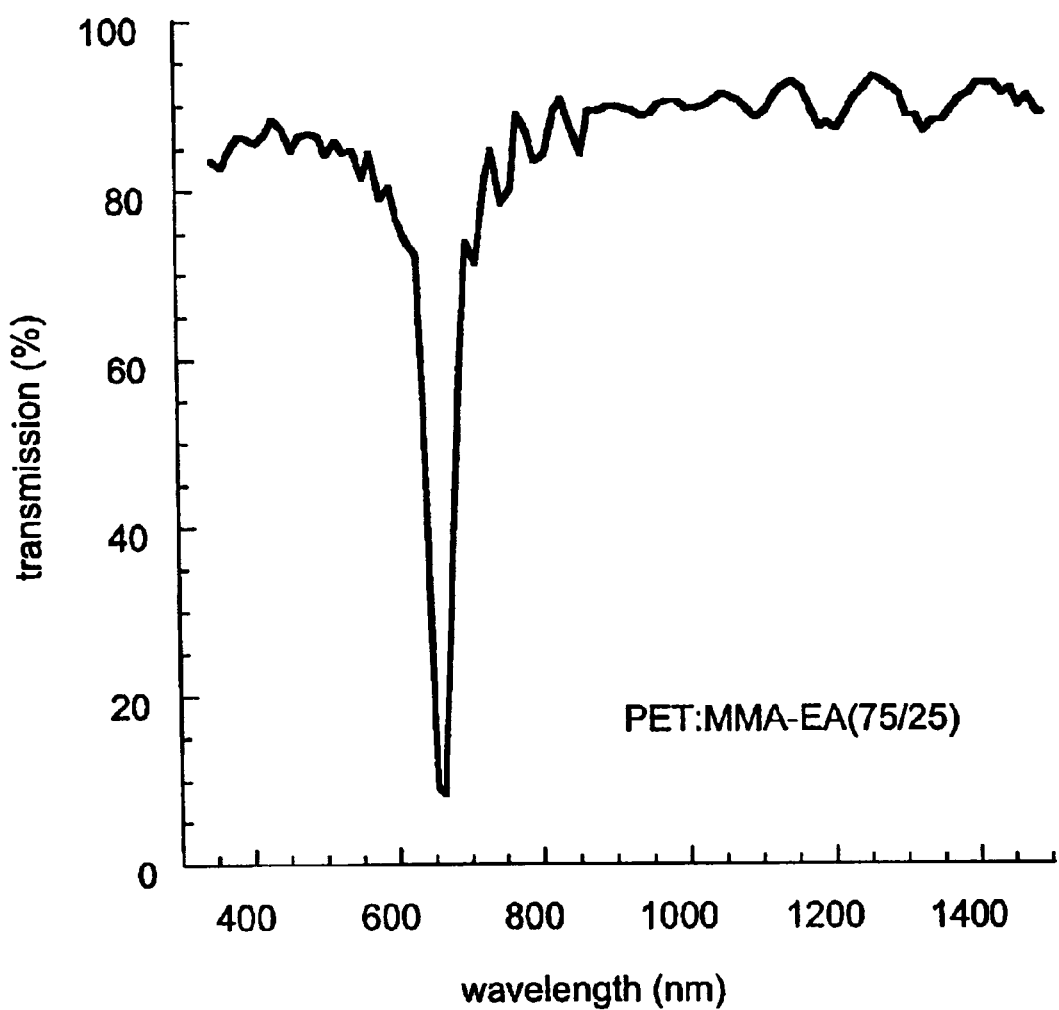
FIG. 6 is the transmission spectrum for the optical film of Example 3.

The optical film had the transmission spectrum illustrated in FIG. 6 for normally incident light. The optical film had a red appearance that changed to yellow as the viewing angle increased with respect to normal incidence.

Example 4

IR Film with PET:MMA-EA Layers. This optical film was made in the same way as the optical film of Example 1, except that the total thickness of the cast film was 625 μm and during the drawing process, the optical film was initially preheated, then biaxially stretched at a 3.6:3.8 ratio at approximately 100° C. The final film thickness was about 51 μm.

The PET first optical layers were oriented by the process as determined by refractive index measurement of the external protective PET layers ($n_{MD}$=1.6426, $n_{TD}$=1.6761, $n_z$=1.4896). The second optical layers were essentially isotropic with a refractive index of about 1.49.

Figure 7:
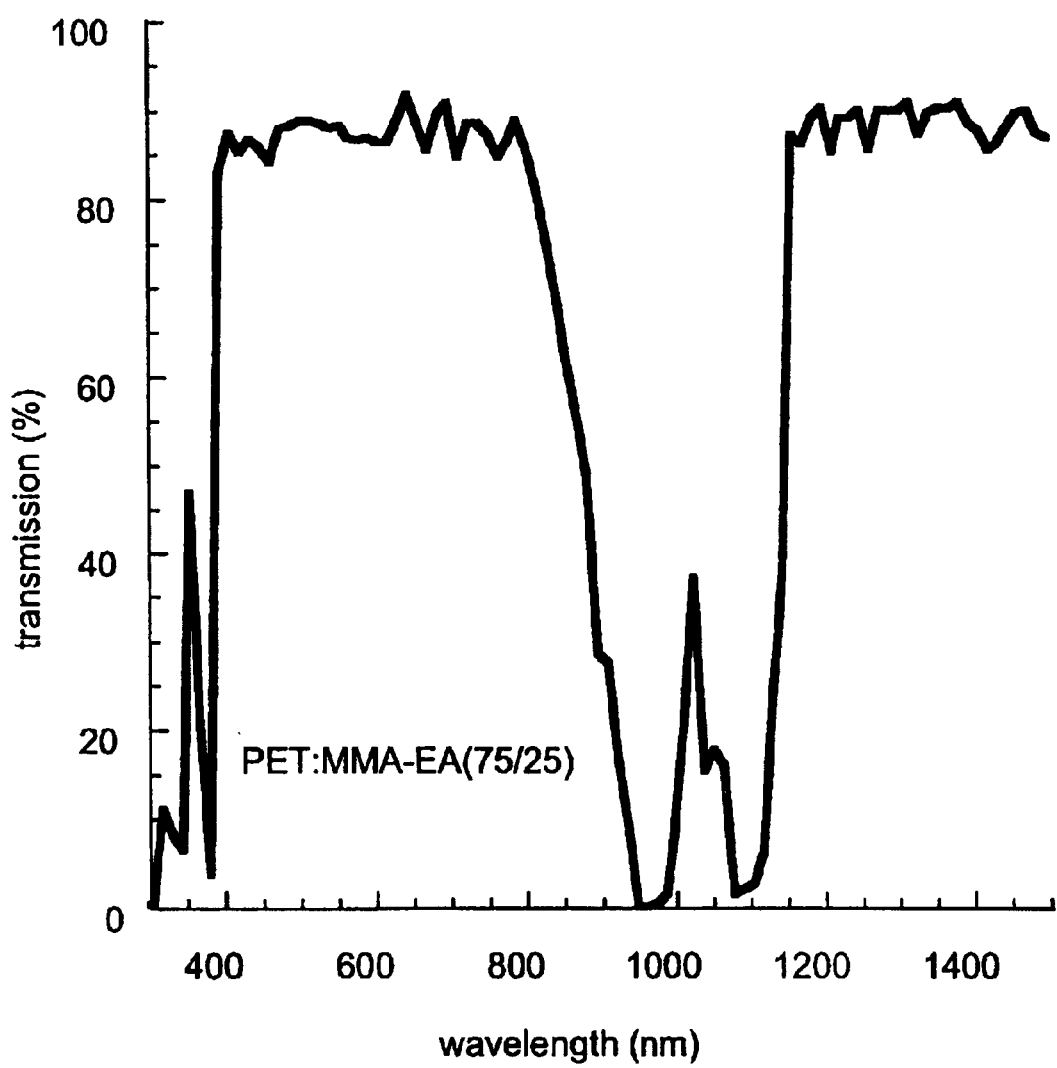
FIG. 7 is the transmission spectrum for the optical film of Example 4.

The optical film had the transmission spectrum illustrated in FIG. 7 for normally incident light.

Example 5

IR Film with PET:MMA-EA Layers. This optical film was made in the same way as the optical film of Example 1, except that the total thickness of the cast film was 625 μm and during the drawing process, the optical film was initially preheated, then stretched in the machine direction to a ratio of 3.6:1 at approximately 100° C., and then stretched in the transverse direction to a ratio of 3.8:1 at approximately 100° C. The final film thickness was about 48.8 μm.

The PET first optical layers were oriented by the process as determined by refractive index measurement of the external protective PET layers ($n_{MD}$=1.6387, $n_{TD}$=1.6755, $n_z$=1.4945). The second optical layers were essentially isotropic with a refractive index of about 1.49.

Figure 8:
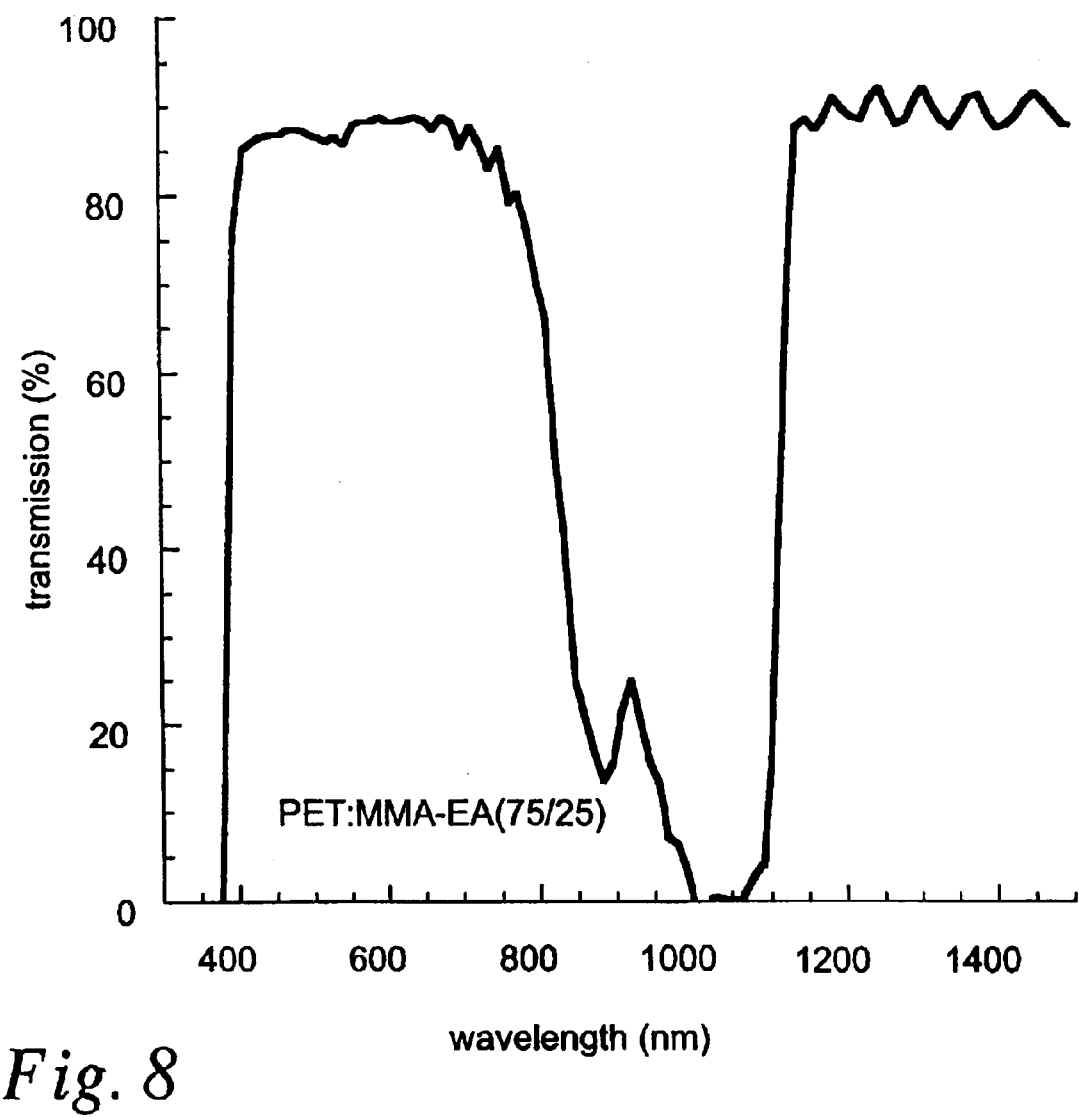
FIG. 8 is the transmission spectrum for the optical film of Example 5.

The optical film had the transmission spectrum illustrated in FIG. 8 for normally incident light.

Example 6

IR Film with PET:MMA-EA Layers. This optical film was made in the same way as the optical film of Example 1, except that only 150 alternating layers were used, and during the drawing process the optical film was initially preheated to 94° C. for 1 minute, then stretched to a draw ratio of 3.6:3.2 at 94° C. at a draw rate of 20%/s The final film thickness was about 29.5 μm.

The PET first optical layers were oriented by the process as determined by refractive index measurement of the external protective PET layers ($n_{MD}$=1.6499, $n_{TD}$=1.6070, $n_z$=1.4969). The second optical layers were essentially isotropic with a refractive index of about 1.49.

Figure 9:
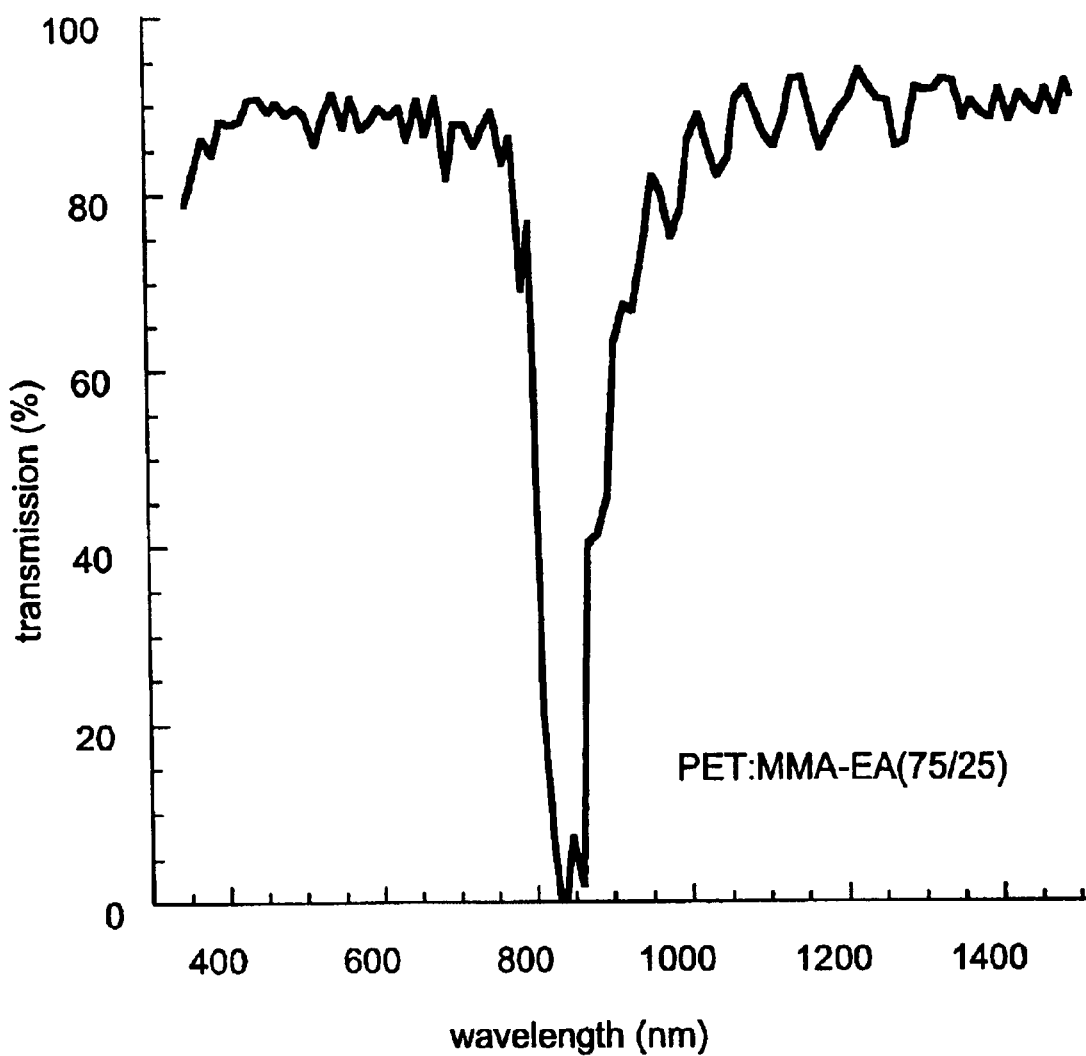
FIG. 9 is the transmission spectrum for the optical film of Example 6.

The optical film had the transmission spectrum illustrated in FIG. 9 for normally incident light.

Example 7

Color-Shifting and IR Films with PET:MMA-nBMA Layers. Optical films can be formed using first optical layers created from PET and second optical layers created from a PMMA copolymer. The PMMA copolymer is formed with MMA comonomer units and n-butyl methacrylate (nBMA) comonomer units. The nBMA comonomer units depress the $T_g$ of the PMMA copolymer below the $T_g$ of PMMA.

Example 8

Color-Shifting and IR Films with PET:MMA-nBMA-EA Layers. Optical films can be formed using first optical layers created from PET and second optical layers created from a PMMA copolymer. The PMMA copolymer is formed with MMA comonomer units, n-butyl methacrylate (NBMA) comonomer units, and ethyl acrylate (EA) comonomer units. The nBMA and EA comonomer units depress the $T_g$ of the PMMA copolymer below the $T_g$ of PMMA. EA comonomer units can also increase the thermal stability of the films.

Example 9

Color-Shifting and IR Films with PET:PEMA Layers. Optical films can be formed using first optical layers created from PET and second optical layers created from polyethyl methacrylate (PEMA). PEMA has a lower glass transition temperature (67° C.) than PMMA (106° C.).

Example 10

Color-Shifting and IR Films with PET:EMA-BA Layers. Optical films can be formed using first optical layers created from PET and second optical layers created from a PEMA copolymer. The PEMA copolymer is formed with ethyl methacrylate (EMA) comonomer units and butyl acrylate (BA) comonomer units. The butyl acrylate comonomer units have a higher allowable odor threshold than ethyl methacrylate and so can be used to make a more acceptable polymer layer.

Example 11

Color-Shifting and IR Films with PET:MMA-EA-MA Layers. Optical films can be formed using first optical layers created from PET and second optical layers created from a PMMA copolymer. The PMMA copolymer is formed with MMA comonomer units, ethyl acrylate (EA) comonomer units, and methacrylic acid (MA) comonomer units. The EA comonomer units depress the $T_g$ of the PMMA copolymer below the $T_g$ of PMMA. EA comonomer units can also increase the thermal stability of the film. MA comonomer units are used to increase interlayer adhesion with the PET first optical layers.

Example 12

Color-Shifting Films with PET:PMMA/PVDF (75/25) Layers. Optical films can be formed using first optical layers created from PET and second optical layers created from a blend of PMMA and poly(vinylidene fluoride) (PVDF) (e.g., Solef™ 1008 available from Solvay Polymers, Inc. (Houston, Tex.)) in a ratio of 75/25 by weight. The PMMA/PVDF blend as a lower $T_g$ (72° C.) and refractive index (1.47) than PMMA. The refractive index difference between the first and second optical layers is about 0.18. PVDF also provides other benefits including improved solvent resistance and weatherability.

Example 13

Color-Shifting and IR Films with PET:PMMA/PVDF (60/40) Layers. Optical films can be formed using first optical layers created from PET and second optical layers created from a blend of PMMA and poly(vinylidene fluoride) (PVDF) (e.g., Solef™ 1008 available from Solvay Polymers, Inc. (Houston, Tex.)) in a ratio of 60/40 by weight. The PMMA/PVDF blend has a lower $T_g$ (66° C.) and refractive index (1.458) than PMMA. The refractive index difference between the first and second optical layers is about 0.19. PVDF also provides other benefits including improved solvent resistance and weatherability.

Example 14

IR Film with PET:PMMA/PVDF (75/25) Layers. An optical film was constructed with first optical layers created from a polyethylene terephthalate (PET) and second optical layers created from a blend using 75 wt. % PMMA (Perspex™ CP82, ICI Americas, Inc. (Wilmington, Del.)) and 25 wt. % polyvinylidene fluoride (PVDF) (Solef™ 1008, Solvay Polymers, Inc. (Houston, Tex.)).

The above described polymers were then coextruded through a multilayer melt manifold to create a multilayer film with 196 alternating first and second optical layers. This particular multilayer reflective film also contained external protective layers made of the same polyethylene terephthalate as the first optical layers. The optical film was initially preheated, then stretched to a ratio of between 3.6 and 3.8 in each of the machine and transverse directions at approximately 100° C. to produce an optical film of approximately 40.4 µm thick.

Figure 10:
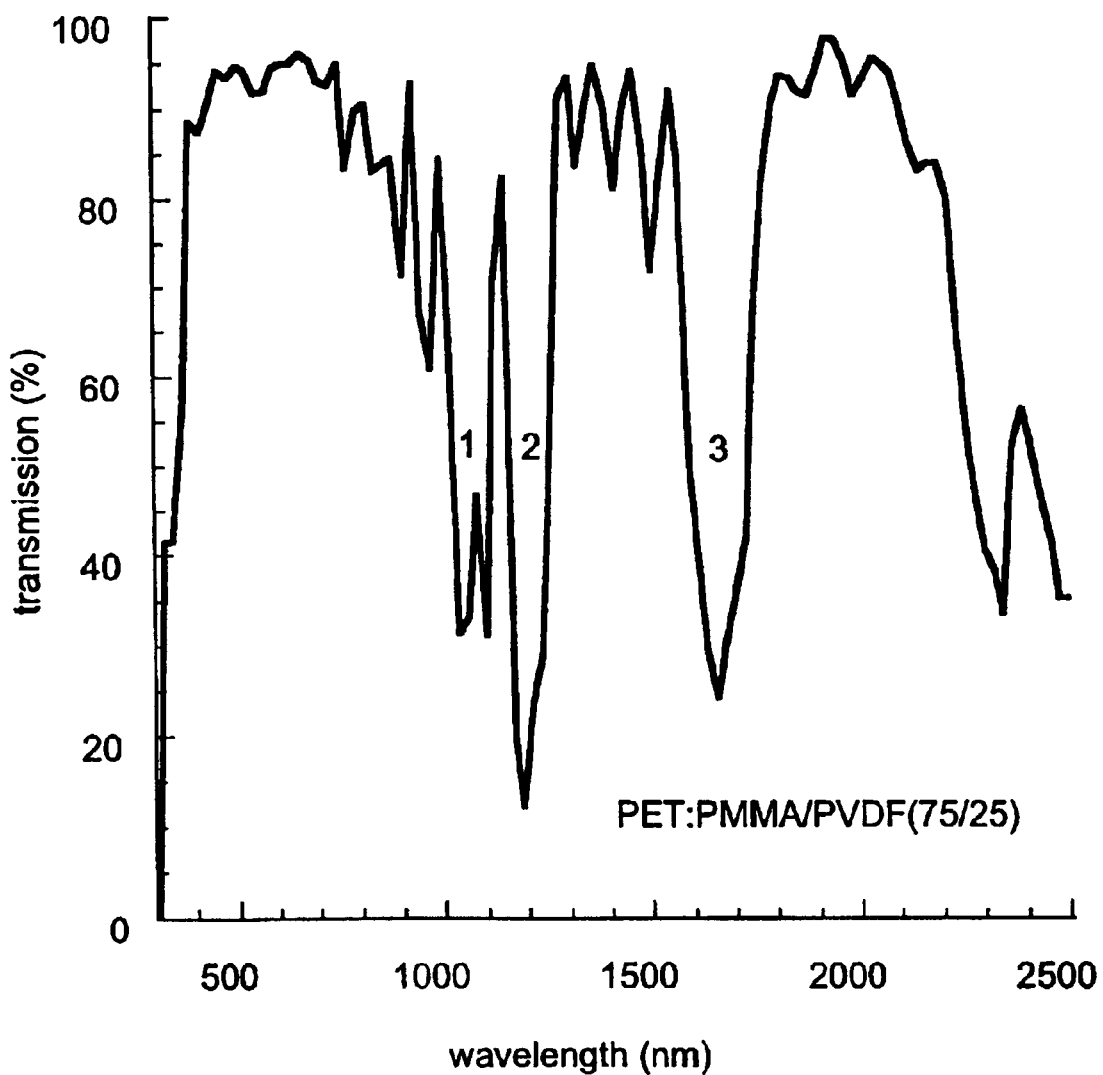
FIG. 10 is the transmission spectrum for the optical film of Example 14.

The optical film had the transmission spectrum illustrated in FIG. 10 for normally incident light.

Example 15

Color-shifting Optical Film with PET:PE-PO Layers. An optical film was constructed with first optical layers created from a polyethylene terephthalate (PET) and second optical layers created from a polyolefin copolymer poly(ethylene-co-octene) (PEPO). The copolymer is available under the product designation "Engage 8200" from Dow-DuPont Elastomers.

The above described polymers were then coextruded through a multilayer melt manifold to create a multilayer film with 224 alternating first and second optical layers. The cast film had a total thickness of about 533 µm. This particular multilayer reflective film also contained external protective layers made of the same polyethylene terephthalate as the first optical layers. The optical film was initially preheated, then stretched in the machine direction to a ratio of 3.8:1 at approximately 100° C., and then stretched in the transverse direction to a ratio of 3.6:1 at approximately 100° C. to produce an optical film of approximately 38.6 µm.

The PET first optical layers were oriented by the process as determined by refractive index measurement of the external protective PET layers ($n_{MD}$=1.6766, $n_{TD}$=1.6400, $n_z$=1.4906). The second optical layers were essentially isotropic with a refractive index of about 1.49.

Figure 11:
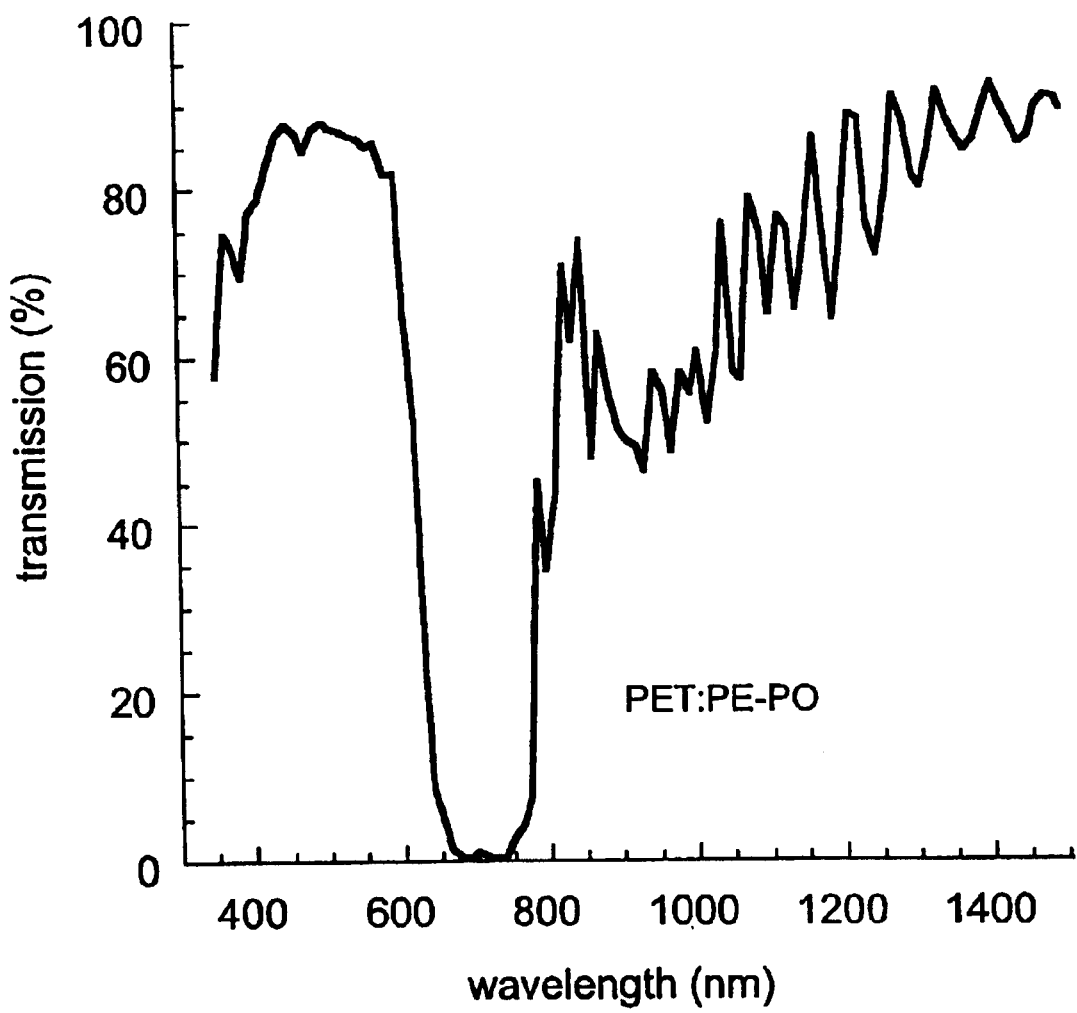
FIG. 11 is the transmission spectrum for the optical film of Example 15.

The optical film had the transmission spectrum illustrated in FIG. 11 for normally incident light. The optical film had a blue appearance that changed to red as the viewing angle increased with respect to normal incidence.

Example 16

IR Film with PET:PE-PO Layers. An optical film was constructed with first optical layers created from a polyethylene terephthalate (PET) and second optical layers created from a polyolefin copolymer poly(ethylene-co-octene) (PE-PO). The copolymer is available under the product designation "Engage 8200" from Dow-DuPont Elastomers.

The above described polymers were then coextruded through a multilayer melt manifold to create a multilayer film with 224 alternating first and second optical layers. The cast film had a total thickness of about 533 µm. This particular multilayer reflective film also contained external protective layers made of the same polyethylene terephthalate as the first optical layers. The optical film was initially preheated, then stretched in the machine direction to a ratio of 3.6:1 at approximately 100° C., and then stretched in the transverse direction to a ratio of 3.8:1 at approximately 100° C. to produce an optical film of approximately 57.1 µm.

The PET first optical layers were oriented by the process as determined by refractive index measurement of the external protective PET layers ($n_{MD}$=1.6400, $n_{TD}$=1.6766, $n_z$=1.4906). The second optical layers were essentially isotropic with a refractive index of about 1.49.

Figure 12:
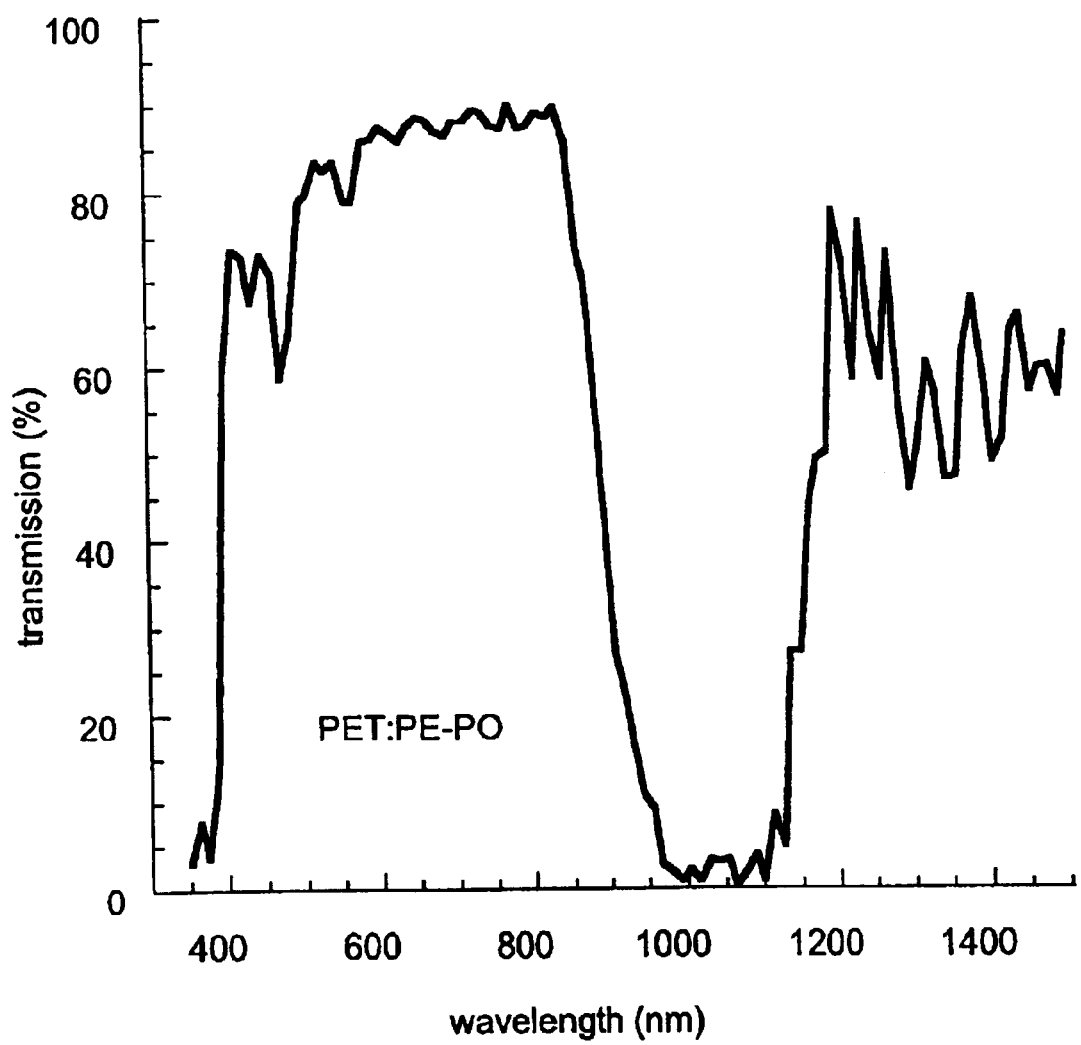
FIG. 12 is the transmission spectrum for the optical film of Example 16.

The optical film had the transmission spectrum illustrated in FIG. 12 for normally incident light. The optical film had a clear appearance with a slight yellow observed at higher viewing angles.

Example 17

Color-shifting Optical Film with PET:PP-PE Layers. An optical film was constructed with first optical layers created from a polyethylene terephthalate (PET) and second optical layers created from a polyolefin copolymer poly(propylene-co-ethylene) (PP-PE). The copolymer is available under the product designation "Z9470" from Fina Oil and Chemical Co., Dallas, Tex.

The above described polymers were then coextruded through a multilayer melt manifold to create a multilayer film with 224 alternating first and second optical layers. The cast film had a total thickness of about 719 µm. This particular multilayer reflective film also contained external protective layers made of the same polyethylene terephthalate as the first optical layers. The cast film was heated in an oven charged with hot air set at 94° C. and then oriented at a 4.4:4.4 draw at a draw temperature of 94° C. and a draw rate of 20%/s.

The PET first optical layers were oriented by the process as determined by refractive index measurement of the external protective PET layers ($n_{MD}$=1.6208, $n_{TD}$=1.6164, $n_z$=1.5132). The second optical layers were essentially isotropic with a refractive index of about 1.49.

Figure 13:
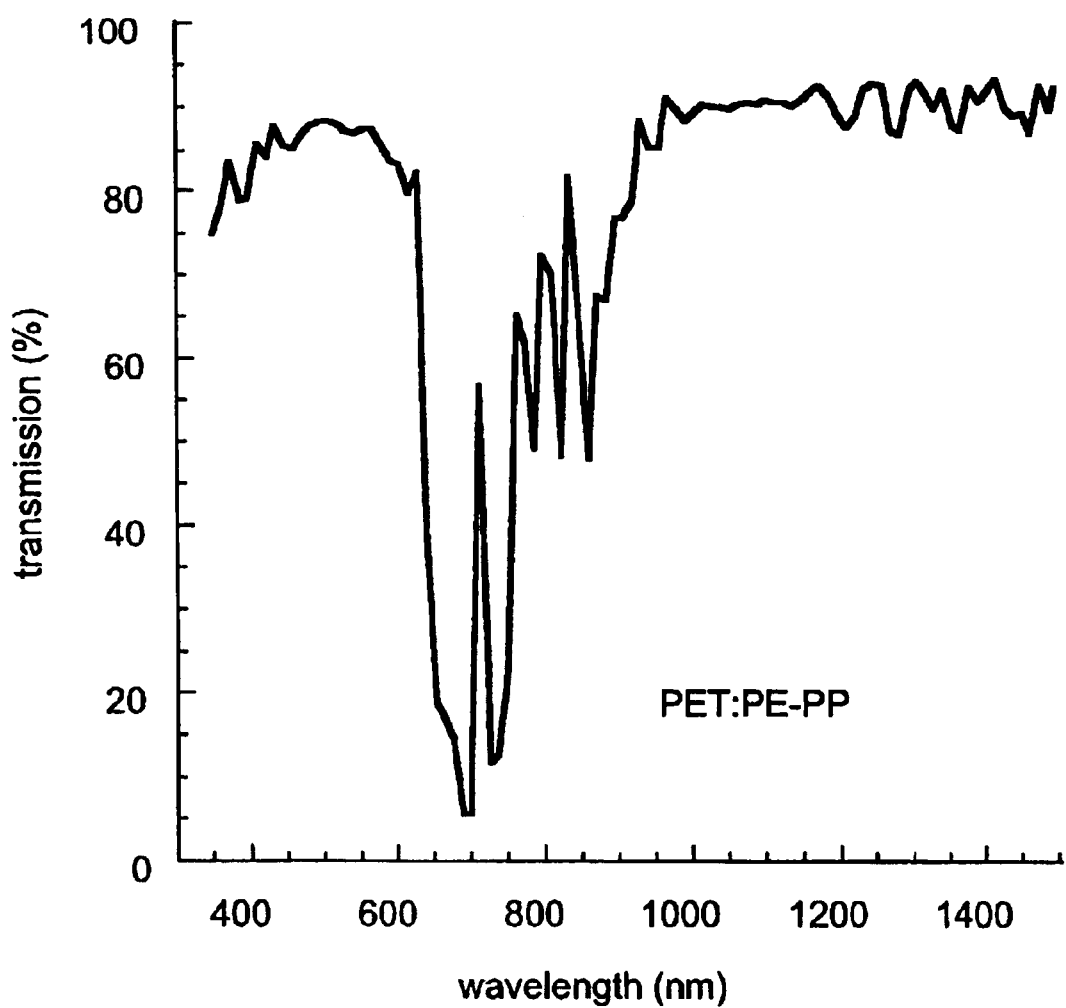
FIG. 13 is the transmission spectrum for the optical film of Example 17.

The optical film had the transmission spectrum illustrated in FIG. 13 for normally incident light. The optical film had a blue appearance that changed to red as the viewing angle increased with respect to normal incidence.

Example 18

IR Film with PET:PP-PE Layers. An optical film was constructed with first optical layers created from a polyethylene terephthalate (PET) and second optical layers created from a polyolefin copolymer poly(propylene-co-ethylene) (PP-PE). The copolymer is available under the product designation "Z9470" from Fina Oil and Chemical Co., Dallas, Tex.

The above described polymers were then coextruded through a multilayer melt manifold to create a multilayer film with 224 alternating first and second optical layers. The cast film had a total thickness of about 719 µm. This particular multilayer reflective film also contained external protective layers made of the same polyethylene terephthalate as the first optical layers. The optical film was initially preheated, then stretched in the machine direction to a ratio of 3.6:1 at approximately 100° C., and then stretched in the transverse direction to a ratio of 3.8:1 at approximately 100° C. to produce an optical film of approximately 42.4 µm.

The PET first optical layers were oriented by the process as determined by refractive index measurement of the external protective PET layers ($n_{MD}$=1.6376, $n_{TD}$=1.6852, $n_z$=1.4860). The second optical layers were essentially isotropic with a refractive index of about 1.49.

Figure 14:
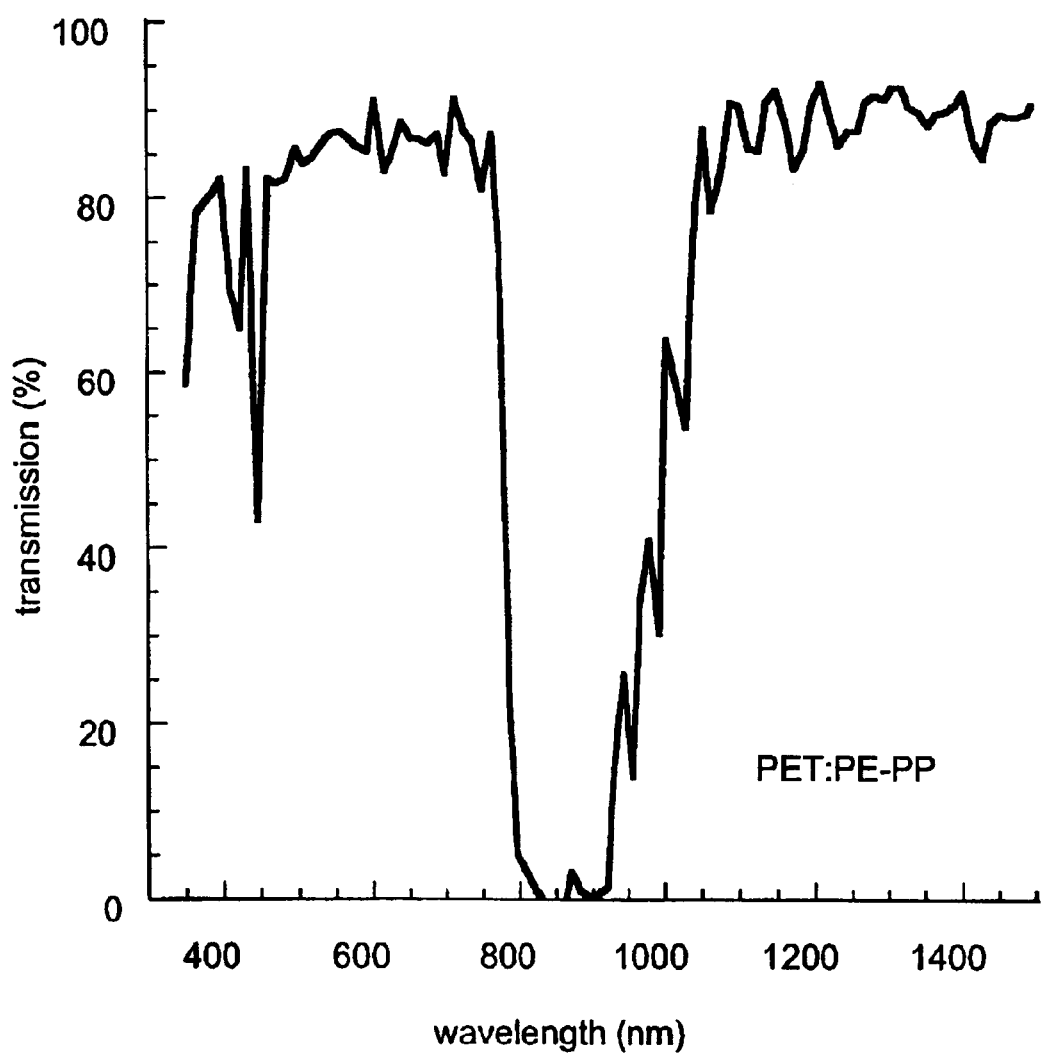
FIG. 14 is the transmission spectrum for the optical film of Example 18.

The optical film had the transmission spectrum illustrated in FIG. 14 for normally incident light. The optical film had a slight yellow appearance at normal incidence, but became clear as viewing angle increased.

Example 19

Color-shifting Optical Film with PET:aPP-iPP Layers. An optical film was constructed with first optical layers created from a polyethylene terephthalate (PET) and second optical layers created from a polyolefin copolymer of atactic polypropylene (aPP) and isotactic polypropylene (iPP). The copolymer is available under the product designation "Rexflex W111" from Huntsman Chemical Corp., Salt Lake City, Utah.

The above described polymers were then coextruded through a multilayer melt manifold to create a multilayer film with 224 alternating first and second optical layers. The cast film had a total thickness of about 683 µm. This particular multilayer reflective film also contained external protective layers made of the same polyethylene terephthalate as the first optical layers. The cast film was heated in an oven charged with hot air set at 94° C. and then oriented at a 3.5:3.5 draw at a draw temperature of 94° C. and a draw rate of 20%/s to produce an optical film of approximately 34 µm.

The PET first optical layers were oriented by the process as determined by refractive index measurement of the external protective PET layers ($n_{MD}$=1.6201, $n_{TD}$=1.6206, $n_z$=1.5064). The second optical layers were essentially isotropic with a refractive index of about 1.49.

Figure 15:
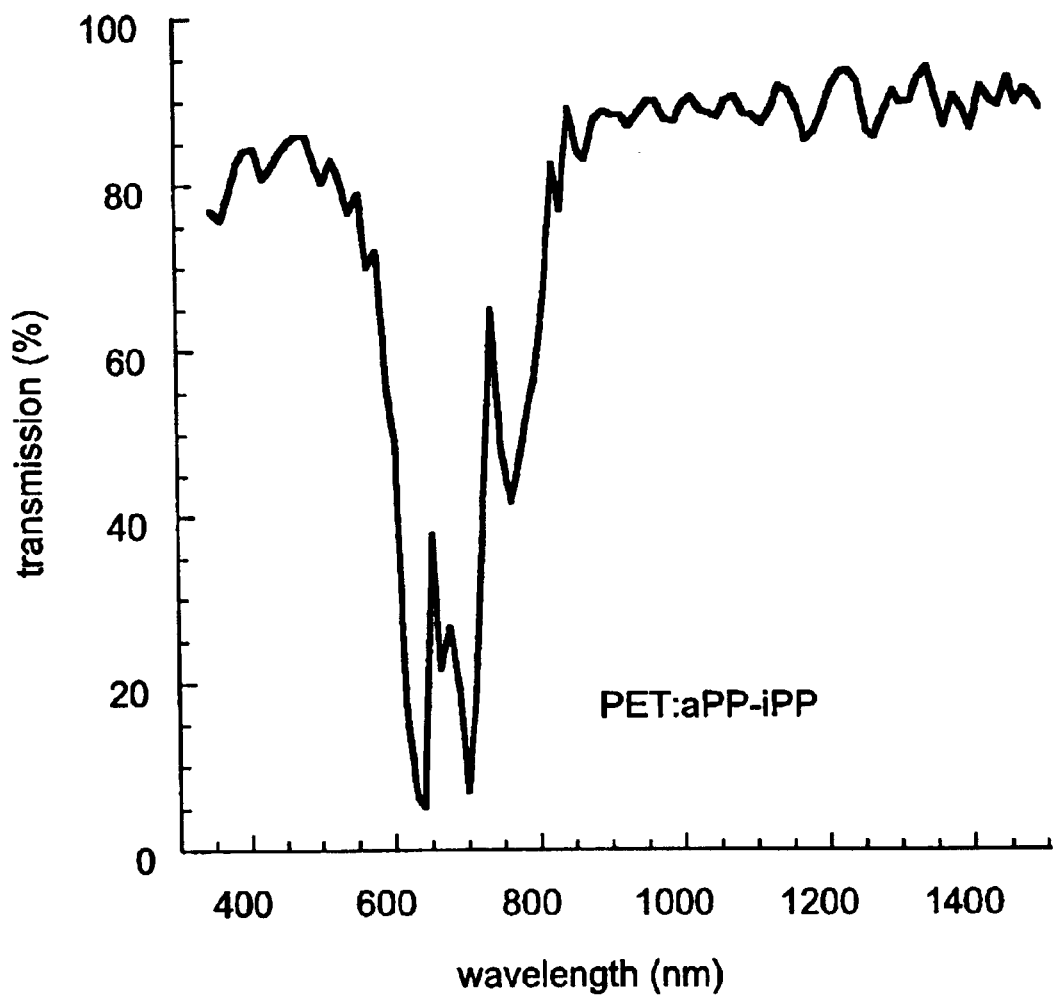
FIG. 15 is the transmission spectrum for the optical film of Example 19.

The optical film had the transmission spectrum illustrated in FIG. 15 for normally incident light. The optical film had a blue appearance that changed to red as the viewing angle increased with respect to normal incidence.

Example 20

IR Film with PET:aPP-iPP Layers. An optical film was constructed with first optical layers created from a polyethylene terephthalate (PET) and second optical layers created from a polyolefin copolymer of atactic polypropylene (aPP) and isotactic polypropylene (iPP). The copolymer is available under the product designation "Rexflex W111" from Huntsman Chemical Corp., Salt Lake City, Utah.

The above described polymers were then coextruded through a multilayer melt manifold to create a multilayer film with 224 alternating first and second optical layers. The cast film had a total thickness of about 683 µm. This particular multilayer reflective film also contained external protective layers made of the same polyethylene terephthalate as the first optical layers. The cast film was heated in an oven charged with hot air set at 94° C. and then oriented at a 2.8:2.8 draw at a draw temperature of 94° C. and a draw rate of 20%/s to produce an optical film.

The PET first optical layers were oriented by the process as determined by refractive index measurement of the external protective PET layers ($n_{MD}$=1.6214, $n_{TD}$=1.6199, $n_z$=1.5059). The second optical layers were essentially isotropic with a refractive index of about 1.49.

Figure 16:
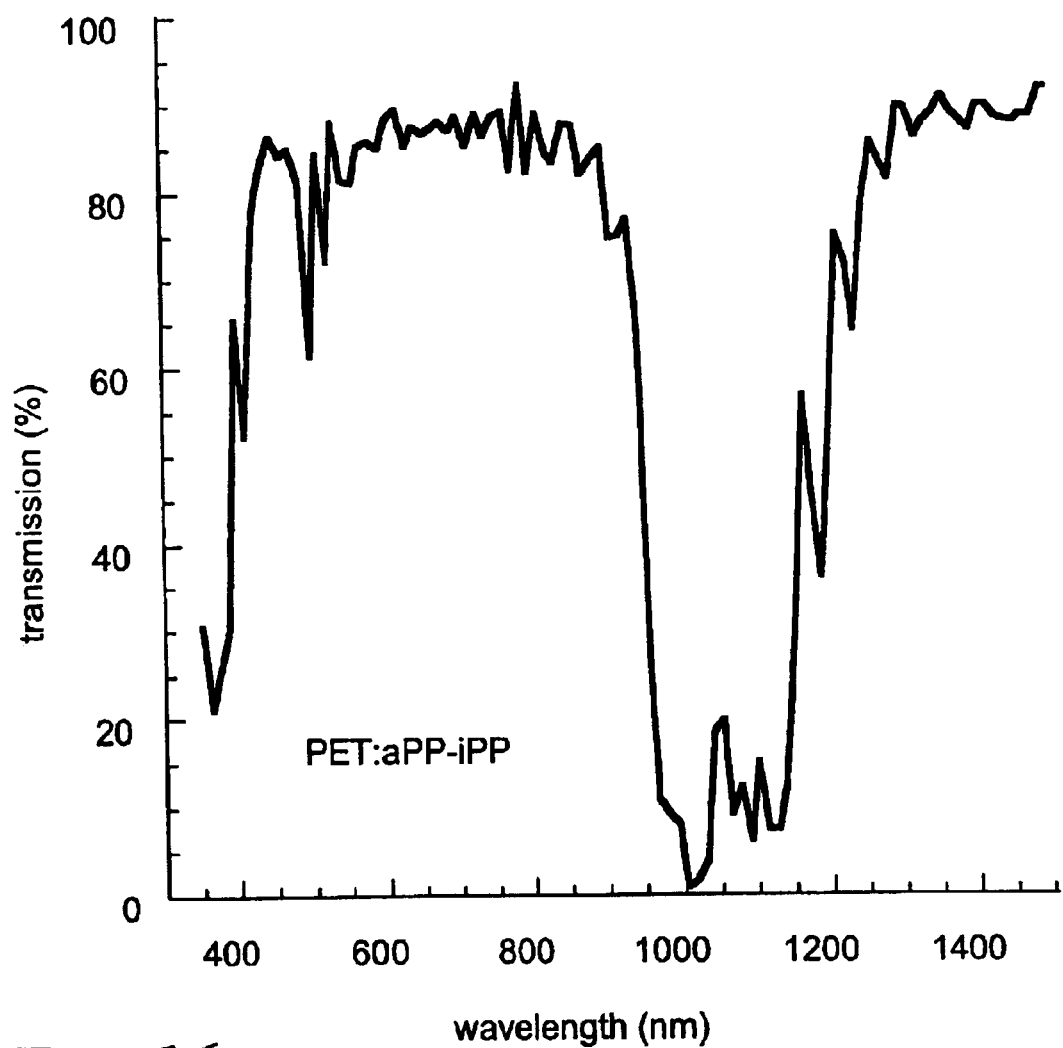
FIG. 16 is the transmission spectrum for the optical film of Example 20.

The optical film had the transmission spectrum illustrated in FIG. 16 for normally incident light. The optical film had a slight red tint at normal incidence, but became clear as viewing angle increased.

Example 21

Color-shifting Optical Film with PET:LLDPE-g-MA Layers. An optical film was constructed with first optical layers created from a polyethylene terephthalate (PET) and second optical layers created from a functionalized polyolefin, linear low density polyethylene-g-maleic anhydride (LLDPE-g-MA). The copolymer is available under the product designation "Bynel 4105" from E. I. duPont de Nemours & Co., Inc. (Wilmington, Del.).

The above described polymers were then coextruded through a multilayer melt manifold to create a multilayer film with 224 alternating first and second optical layers. This particular multilayer reflective film also contained external protective layers made of the same polyethylene terephthalate as the first optical layers. The cast film was heated in an oven charged with hot air set at 94° C. and then oriented at a 3.5:3.7 draw at a draw temperature of 94° C. and a draw rate of 20%/s to produce an optical film of approximately 33.8 µm.

The PET first optical layers were oriented by the process as determined by refractive index measurement of the external protective PET layers ($n_{MD}$=1.6175, $n_{TD}$=1.6268, $n_z$=1.5075). The second optical layers were essentially isotropic with a refractive index of about 1.49.

Figure 17:
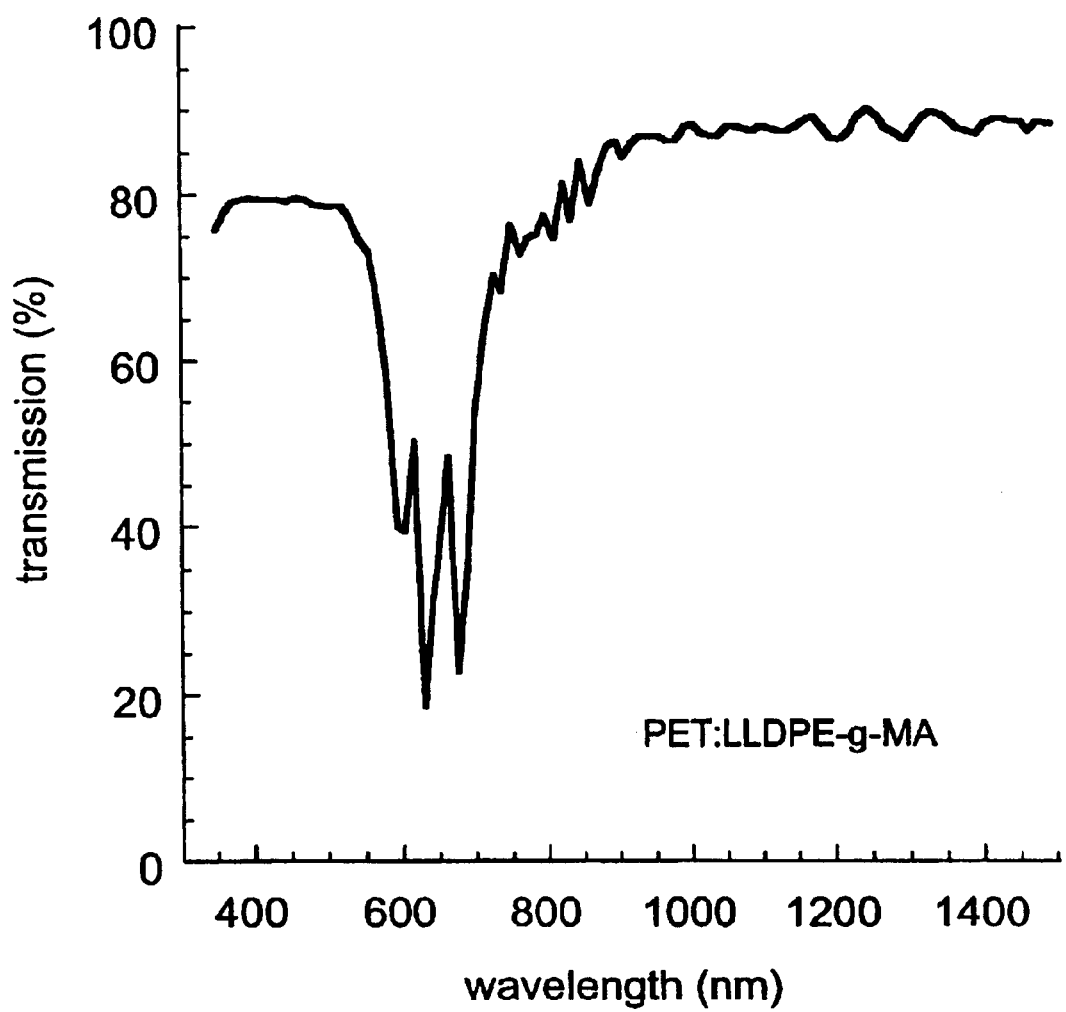
FIG. 17 is the transmission spectrum for the optical film of Example 21.

The optical film had the transmission spectrum illustrated in FIG. 17 for normally incident light.

Example 22

IR Film with PET:LLDPE-g-MA Layers. An optical film was constructed with first optical layers created from a polyethylene terephthalate (PET) and second optical layers created from a functionalized polyolefin, linear low density polyethylene-g-maleic anhydride (LLDPE-g-MA). The copolymer is available under the product designation "Bynel 4105" from E. I. duPont de Nemours & Co., Inc. (Wilmington, Del.).

The above described polymers were then coextruded through a multilayer melt manifold to create a multilayer film with 224 alternating first and second optical layers. This particular multilayer reflective film also contained external protective layers made of the same polyethylene terephthalate as the first optical layers. The optical film was initially preheated, then stretched in the machine direction to a ratio of 3.6:1 at approximately 100° C., and then stretched in the transverse direction to a ratio of 3.8:1 approximately 100° C. to produce an optical film of approximately 40.9 μm.

The PET first optical layers were oriented by the process as determined by refractive index measurement of the external protective PET layers ($n_{MD}$=1.6378, $n_{TD}$=1.6847, $n_z$=1.4869). The second optical layers were essentially isotropic with a refractive index of about 1.49.

Figure 18:
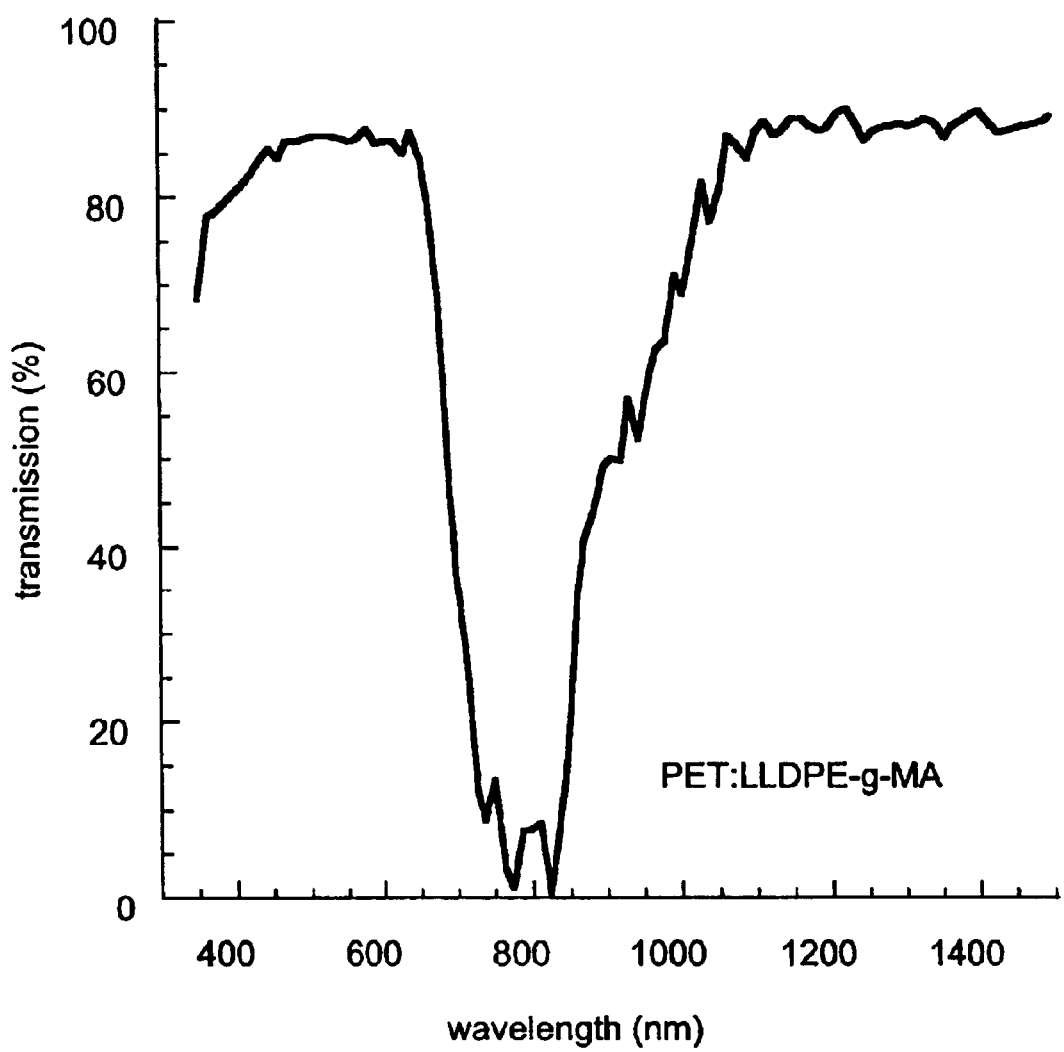
FIG. 18 is the transmission spectrum for the optical film of Example 22.

The optical film had the transmission spectrum illustrated in FIG. 18 for normally incident light. The optical film was clear at normal incidence, but became slightly blue as viewing angle increased.

Example 23

Color-Shifting and IR Films with PET:EVA Layers. Oriented Optical films can be formed using first optical layers created from PET and second optical layers created from poly(ethylene-co-vinyl acetate) (EVA).

Example 24

Color-Shifting and JR Films with PET:EVA/PE-PP Layers. Oriented Optical films can be formed using first optical layers created from PET and second optical layers created from a miscible blend of poly(ethylene-co-vinyl acetate) and poly(ethylene-co-propylene).

Example 25

Color-Shifting and IR Films with PET-PC:PMMA Layers. Oriented Optical films can be formed using first optical layers created from copolymerization or reactive blending of PET and polycarbonate (PC) and second optical layers created from polymethyl methacrylate (PMMA). Polycarbonate has a glass transition temperature of 157° C.

Example 26

Color-Shifting and IR Films with PET-PAr:PMMA Layers. Oriented Optical films can be formed using first optical layers created from copolymerization or reactive blending of PET and polyarylate (PAr) and second optical layers created from polymethyl methacrylate (PMMA). Polyarylate has a glass transition temperature of 193° C.

Example 27

Color-Shifting and IR Films with PET/PEI:PMMA Layers. Oriented Optical films can be formed using first optical layers created from miscible blending of PET and polyetherimide (PEI) and second optical layers created from polymethyl methacrylate (PMMA). Polyetherimide has a glass transition temperature of 218° C.

Example 28

Color-Shifting and IR Films with PET-PEN (90/10):EVA Layers. Oriented Optical films can be formed using first optical layers created from copolymerization or reactive blending of 90 wt. % PET and 10 wt. % PEN and second optical layers created from poly(ethylene-co-vinyl acetate) (EVA).

Example 29

Color-Shifting and IR Films with PET-PEN (30/70):EVA Layers. Oriented Optical films can be formed using first optical layers created from copolymerization or reactive blending of 30 wt. % PET and 70 wt. % PEN and second optical layers created from poly(ethylene-co-vinyl acetate) (EVA).

Examples 30

Multilayer Optical Film with PEN:PMMA/PVDF(60/40) Layers

A multilayer cast film was coextruded containing about 450 layers of alternating PEN (0.48 intrinsic viscosity from Eastman Chemical Products, Inc., Kingsport, Tenn.) and a miscible PMMA/PVDF(60/40, by weight) blend. PMMA was Perspex™ CP80 from ICI Americas, Inc. (Wilmington, Del.) and PVDF was Solef™ 1008 from Solvay Polymers, Inc. (Houston, Tex.). The extruded cast film was subsequently and continuously biaxally-oriented. The sequential biaxial orientation process involved a first orientation step in the machine direction (MD) in a length orienter followed by a transverse direction (TD) orientation in a tenter. The finished optical film had an overall thickness of approximately 58.4 μm.

For comparison a PEN:PMMA multilayer mirror film was processed with the same equipment and under similar conditions.

The two films differed in the refractive index of the low index material, PMMA (n=1.49) and PMMA/PVDF(60/40) (n=1.458). As stated, the high index material is the same for both films, PEN (n=1.75).

Figure 19:
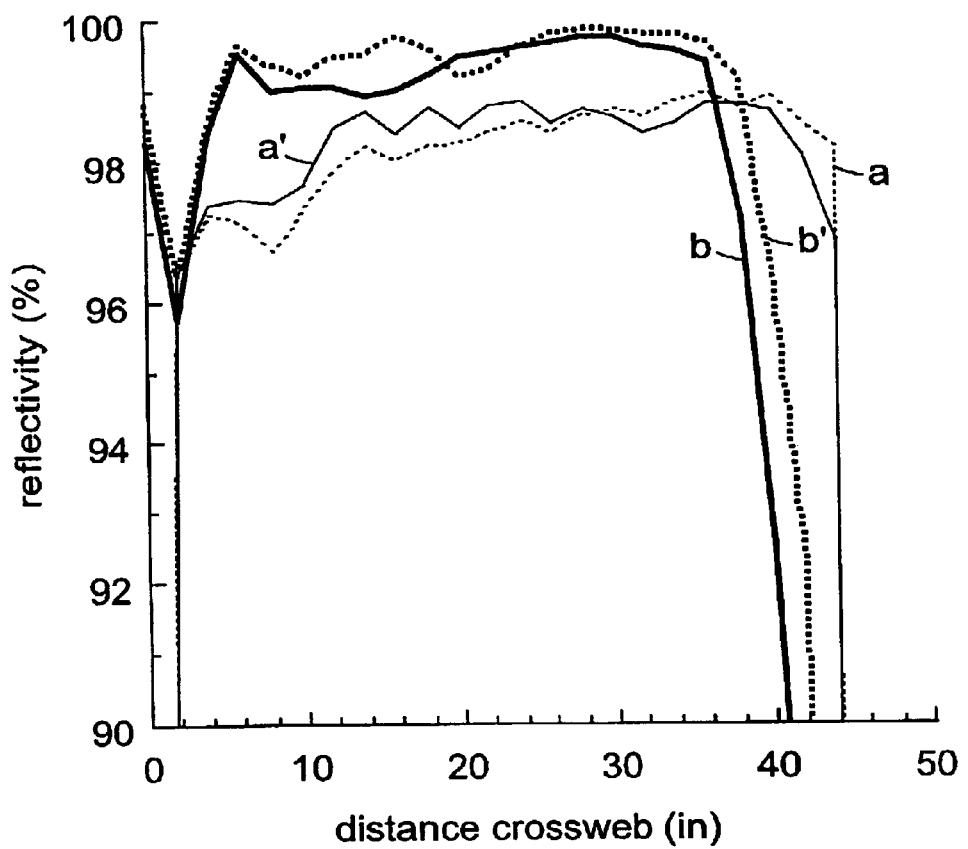
FIG. 19 is a graph of the comparison of reflectivity between optical films with PMMA/PVDF and PMMA as second optical layers.

FIG. 19 clearly shows the higher average reflectivity of the PEN:PMMA/PVDF(60/40) (Δn=0.29) multilayer mirror film relative to the PEN:PMMA (Δn=0.26) over a majority of the width. The reflectivity of FIG. 1 is a photopical average from measured transmission spectra (CIE Illuminant C, 2° observer).

Figure 20:
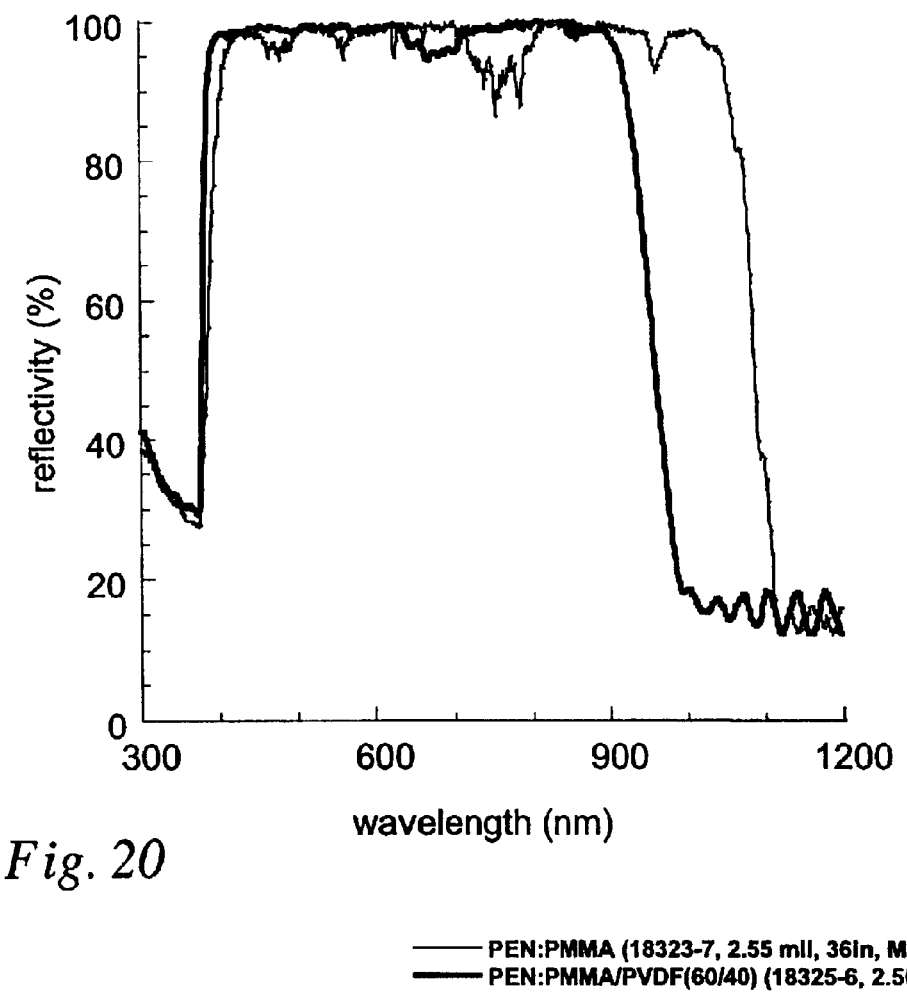
FIG. 20 is a graph of reflectivity for optical films with PMMA/PVDF and PMMA as second optical layers, at the same crossweb position.

FIG. 20 shows the reflectivity of the PEN:PMMA and PEN:PMMA/PVDF(60/40) films as a function of wavelength. The reflectivity in FIG. 20 is calculated from measured transmission (%reflectivity=100-%transmission). The PEN:PMMA film shows a relatively nonuniform spectrum with a significant degree of "spikes" which lead to undesirable spectral nonuniformity (iridescence). The spectral nonuniformity (iridescence) is associated with processing difficulties including layer thickness variations and lack of optical packet overlap. The higher refractive index difference of the PEN:PMMA/PVDF(60/40) multilayer mirror film results in a significant dampening of the spectral nonuniformity (iridescence). The demonstrated reduction in spectral nonuniformity (iridescence) in the PEN:PMMA/PVDF(60/40) film relative to the PEN:PMMA film represents both an optical and processing benefit.

Figure 21:
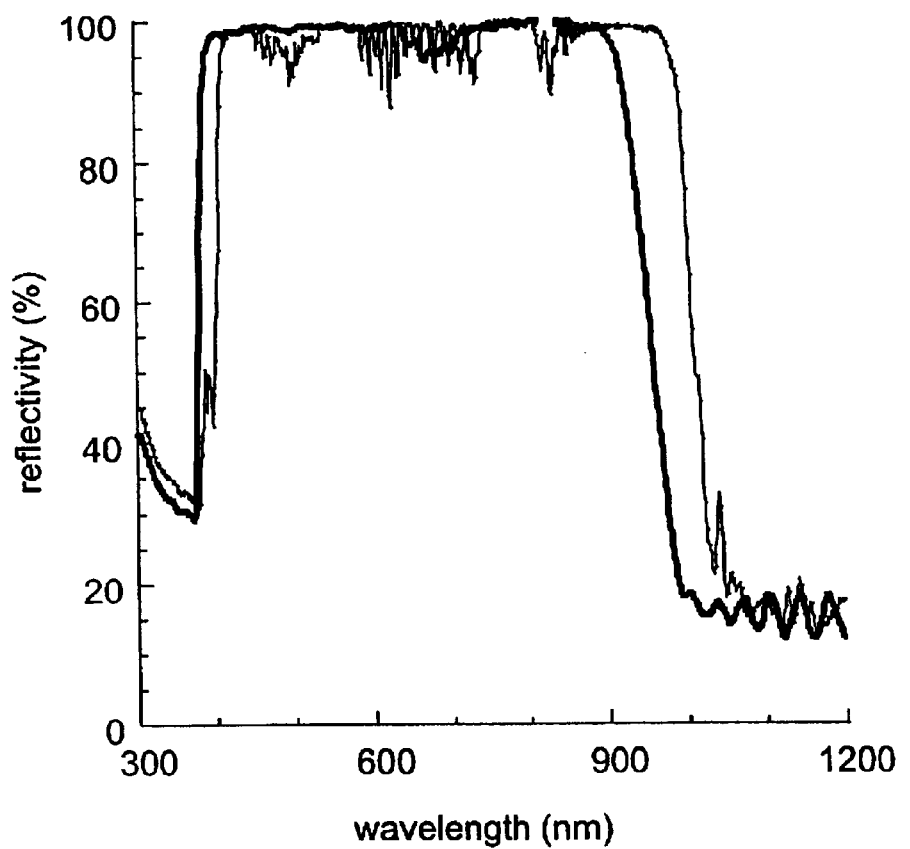
FIG. 21 is a graph of reflectivity for optical films with PMMA/PVDF and PMMA as second optical layers and with similar bandwidths.

FIG. 21 shows the same reduction in spectral nonuniformity (iridescence) with PEN:PMMA/PVDF(60/40) relative to PEN:PMMA for films of similar bandwidths.

Figure 22:
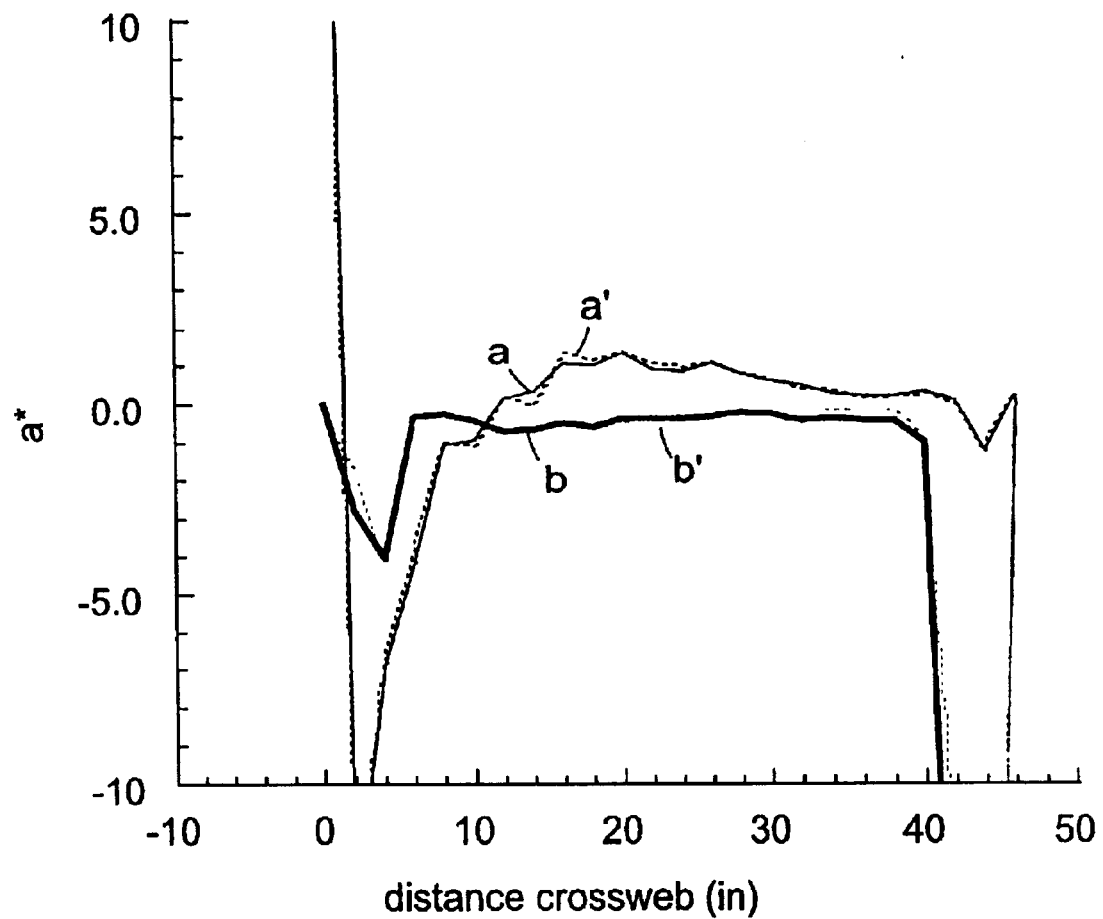
FIG. 22 is a comparison of a* as a function of wavelength for optical films with PMMA/PVDF and PMMA as second optical layers.
Figure 23:
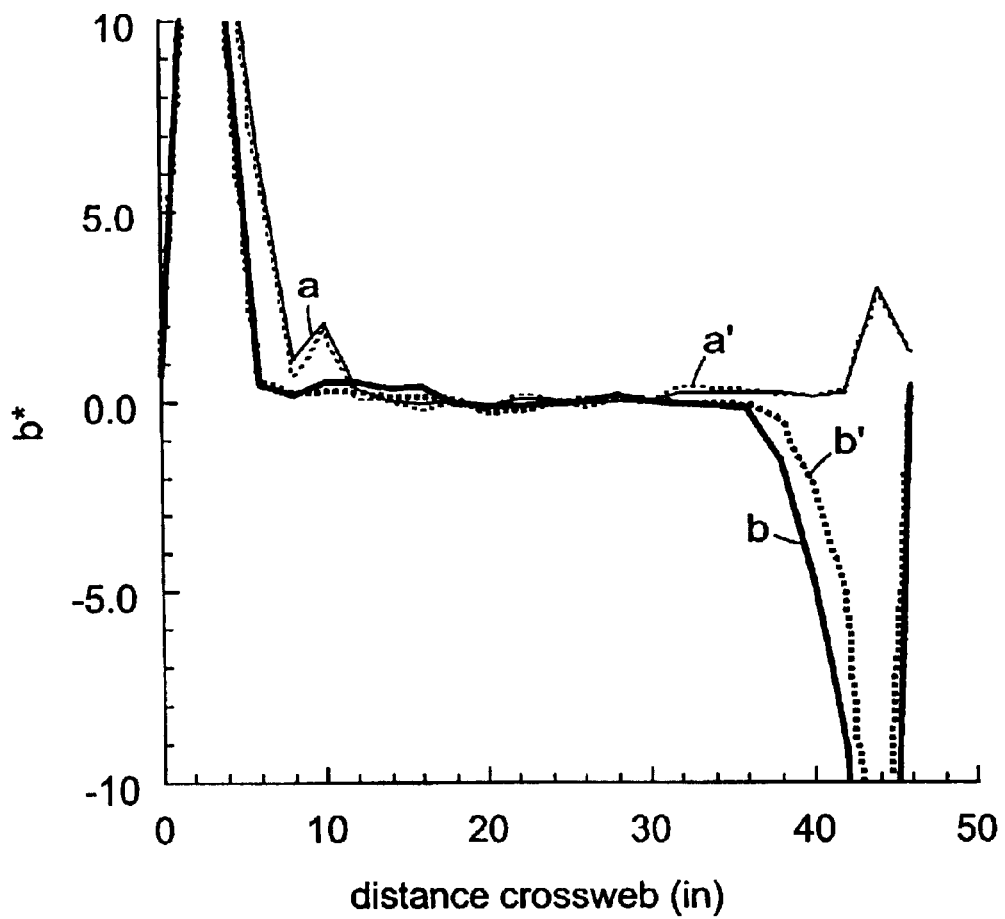
FIG. 23 is a comparison of b* as a function of wavelength for optical films with PMMA/PVDF and PMMA as second optical layers.

FIGS. 22 and 23 show a comparison of color index parameters as a function of crossweb distance for the PEN:PMMA and PEN:PMMA/PVDF(60/40) films. The color index parameters were photopically averaged from measured transmission spectra (CIE Illuminant C, 2° observer). Ideally the color index parameters are zero. The figures show PEN:PMMA/PVDF(60/40) film shows better color performance relative to the PEN:PMMA film over a majority of the film width.

The crossweb caliper uniformity of the PEN:PMMA film was significantly better than the PEN:PMMA/PVDF(60/40) film. It is noted that the time invested to achieve good crossweb caliper uniformity in the PEN:PMMA film was not invested to achieve the same in the PEN:PMMA/PVDF(60/40) film. Despite the better crossweb caliper uniformity of the PEN:PMMA film, FIGS. 19–23 show superior optical performance of the PEN:PMMA/PVDF(60/40) film. This result illustrates a relaxation of the crossweb caliper uniformity constraint associated with processing of multilayer optical films. This is another example of how a large refractive index difference material combination such as PEN:PMMA/PVDF(60/40) results in a more robust process. Furthermore, it is expected that better crossweb caliper uniformity is achievable in the PEN:PMMA/PVDF(60/40) film resulting in even better optical performance relative to a PEN:PMMA film.

Examples 31

Multilayer Optical Film with coPEN(70/30):PMMA/PVDF(60/40) Layers. A multilayer optical film similar to that of Example 30 was formed except that a copolymer of PEN with carboxylate subunits formed using 70 wt. % naphthalate monomers and 30 wt. % terephthalate monomers was used. The first optical layers of this multilayer optical film possess the same refractive index difference as the PEN:PMMA formulation (Δn=0.29) thus the expectation of similar optical and processing performance. The lower PEN content provides a film with a UV absorption band edge further from the visible region of the spectrum allowing easier UV protection of the film. The lower glass transition temperature of the coPEN (110° C.) relative to PEN (124° C.) may also have benefits in thermoforming, embossing, and the like.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

We claim:

1. An article, comprising:
   a mirror comprising
      a plurality of first optical layers, each first optical layer being oriented and comprising a polyester having terephthalate comonomer units and ethylene glycol comonomer units, and
      a plurality of second optical layers disposed in a repeating sequence with the plurality of first optical layers, each second optical layer comprising a polymeric material selected from a polyolefin copolymer and an acid-modified polyolefin,
      the mirror being configured and arranged to reflect at least a portion of light over at least one wavelength region.

2. The article of claim 1, wherein the mirror is configured and arranged to reflect a substantial portion of light in an infrared wavelength region.

3. The article of claim 1, wherein the mirror is configured and arranged to reflect a substantial portion of light in a visible wavelength region.

4. The article of claim 1, wherein the mirror is configured and arranged to reflect a substantial portion of light in an ultraviolet wavelength region.

5. The article of claim 1, wherein the polymeric material of the second optical layers is selected from poly(ethylene-co-octene), poly(propylene-co-ethylene), a copolymer of atactic and isotactic polypropylene, and poly(ethylene-co-vinyl acetate).

6. The article of claim 1, wherein the first optical layers have an in-plane birefringence of at least about 0.05.

7. The article of claim 1, wherein the polyester of the first optical layers is polyethylene terephthalate.

8. The article of claim 1, wherein the polymeric material of the second optical layers comprises maleic anhydride functionalized linear low density polyethylene.

9. An article, comprising:
   a light source; and
   an optical body disposed to receive light from the light source, the optical body comprising
      a plurality of first optical layers, each first optical layer being oriented and comprising a polyester having terephthalate comonomer units and ethylene glycol comonomer units, and
      a plurality of second optical layers disposed in a repeating sequence with the plurality of first optical layers, each second optical layer comprising a polymeric material selected from a polyolefin copolymer and an acid-modified polyolefin,
      the optical body being configured and arranged to reflect at least a portion of light over at least one wavelength region.

10. The article of claim 9, wherein the optical body is configured and arranged to reflect a substantial portion of light in an infrared wavelength region.

11. The article of claim 9, wherein the optical body is configured and arranged to reflect a substantial portion of light in a visible wavelength region.

12. The article of claim 9, wherein the optical body is configured and arranged to reflect a substantial portion of light in an ultraviolet wavelength region.

13. The article of claim 9, wherein z-axis refractive indices of the first and second optical layers differ by no more than about 0.04.

14. The article of claim 9, wherein polymeric material of the second optical layers is selected from poly(ethylene-co-octene), poly(propylene-co-ethylene), a copolymer of atactic and isotactic polypropylene, and poly(ethylene-co-vinyl acetate).

15. The article of claim 9, wherein the first optical layers have an in-plane birefringence of at least about 0.05.

16. The article of claim 9, wherein the polyester of the first optical layers is polyethylene terephthalate.

17. The article of claim 9, wherein the polymeric material of the second optical layers comprises maleic anhydride functionalized linear low density polyethylene.

18. The article of claim 9, wherein at least one in-plane index of refraction of the first optical layers differs by at least about 0.1 from an in-plane index of refraction, in the same direction, of the second optical layers.

19. The article of claim 9, wherein the optical body has a blue appearance that shifts to red as the viewing angle increases with respect to normal incidence.

* * * * *

UNITED STATES PATENT AND TRADEMARK OFFICE
CERTIFICATE OF CORRECTION

PATENT NO. : 6,744,561 B2
DATED : June 1, 2004
INVENTOR(S) : Condo, Peter D.

It is certified that error appears in the above-identified patent and that said Letters Patent is hereby corrected as shown below:

<u>Title page</u>,
Item [56], References Cited, U.S. PATENT DOCUMENTS, delete "Fijfschilling" and insert -- Fünfschilling --, therefore.

<u>Column 5</u>,
Line 34, after "differ" delete ",".

<u>Column 7</u>,
Line 16, delete "It" and insert -- IR --, therefore.

<u>Column 9</u>,
Line 16, delete "norbomanediol" and insert -- norbornanediol --, therefore.

<u>Column 10</u>,
Line 39, after "second" delete "is".

<u>Column 18</u>,
Line 32, delete "terephihalate" and insert -- terephthalate --, therefore.

<u>Column 20</u>,
Line 21, delete "20%/s" and insert -- 20%/s. --, therefore.
Line 45, delete "(NBMA)" and insert -- (nBMA) --, therefore.

<u>Column 25</u>,
Line 35, delete "JR" and insert -- IR --, therefore.

<u>Column 26</u>,
Line 25, delete "biaxally" and insert -- biaxially --, therefore.

UNITED STATES PATENT AND TRADEMARK OFFICE
CERTIFICATE OF CORRECTION

PATENT NO. : 6,744,561 B2
DATED : June 1, 2004
INVENTOR(S) : Condo, Peter D.

It is certified that error appears in the above-identified patent and that said Letters Patent is hereby corrected as shown below:

Column 27,
Line 23, delete "Examples" and insert -- Example --, therefore.

Signed and Sealed this

Twenty-third Day of November, 2004

JON W. DUDAS
*Director of the United States Patent and Trademark Office*